(12) United States Patent
Berbee et al.

(10) Patent No.: US 10,941,220 B2
(45) Date of Patent: Mar. 9, 2021

(54) PROCESS FOR MAKING HIGH PRESSURE FREE RADICAL ETHYLENE COPOLYMERS

(71) Applicant: Dow Global Technologies LLC, Midland, MI (US)

(72) Inventors: Otto J. Berbee, Hulst (NL); Stefan Hinrichs, Seward, NE (US); Hayley A. Brown, Houston, TX (US); Bharat I. Chaudhary, Princeton, NJ (US); John O. Osby, Lake Jackson, TX (US); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 119 days.

(21) Appl. No.: 16/307,371

(22) PCT Filed: Jun. 23, 2017

(86) PCT No.: PCT/US2017/039026
§ 371 (c)(1),
(2) Date: Dec. 6, 2018

(87) PCT Pub. No.: WO2017/223467
PCT Pub. Date: Dec. 28, 2017

(65) Prior Publication Data
US 2019/0194361 A1 Jun. 27, 2019

Related U.S. Application Data

(60) Provisional application No. 62/354,457, filed on Jun. 24, 2016.

(51) Int. Cl.
*C08F 218/08* (2006.01)
*C08F 2/01* (2006.01)
(Continued)

(52) U.S. Cl.
CPC .............. *C08F 2/01* (2013.01); *B01J 19/2415* (2013.01); *C08F 2/00* (2013.01); *C08F 2/001* (2013.01);
(Continued)

(58) Field of Classification Search
CPC .......... C08F 2/01; C08F 2/001; C08F 210/16; C08F 218/08; C08F 216/08; C08F 216/12;
(Continued)

(56) References Cited

U.S. PATENT DOCUMENTS 4,014,859 A 3/1977 Cooper et al.
6,569,962 B1 5/2003 Zschoch et al.
(Continued)

FOREIGN PATENT DOCUMENTS

DE 276598 A3 3/1990
EP 2636691 A1 9/2013
(Continued)

OTHER PUBLICATIONS

International Search Report and Written Opinion pertaining to PCT/US2017/039026 dated Oct. 6, 2017.
(Continued)

*Primary Examiner* — Rip A Lee
(74) *Attorney, Agent, or Firm* — Dinsmore & Shoh LLP

(57) ABSTRACT

A high pressure polymerization process to form an ethylene-based polymer, the process comprising at least the following step: polymerizing a reaction mixture comprising ethylene and at least one comonomer, using a reactor system comprising a reactor configuration, and the following: (A) at least two reaction zones, a zone (reaction zone 1) and an ith zone (reaction zone i where i≥2), (B) at least two ethylene-based feed streams, each comprising a percentage of the total make-up ethylene fed to the polymerization process,
(Continued)

and wherein a first stream is sent to reaction zone 1 and a second stream is sent to reaction zone i; (C) a control system to control the percentage of the total make-up ethylene in the stream sent to reaction zone 1, and the percentage of the total make-up ethylene in the stream sent to reaction zone i, and wherein the ratio (Q) of the molar concentration of the at least one comonomer fed to the first reaction zone, to the molar concentration of comonomer in the sum of all ethylene-based feeds to the reactor configuration, meets the following Equation 1: $0.23 \ln(r1)-2.16 \leq Q \leq -0.25 \ln(r1)+2.15$ (Equation 1); and wherein the comonomer has a reactivity ratio (r1) as follow: $0.3 \leq r1 \leq 5.0$, and a boiling point (1 atm)$\leq 150°$ C.

9 Claims, 6 Drawing Sheets

(51) Int. Cl.
| | | |
|---|---|---|
| *C08F 2/00* | (2006.01) | |
| *B01J 19/24* | (2006.01) | |
| *C08F 210/02* | (2006.01) | |
| *C08F 210/16* | (2006.01) | |
| *C08F 230/08* | (2006.01) | |

(52) U.S. Cl.
CPC .......... *C08F 210/02* (2013.01); *C08F 210/16* (2013.01); *C08F 218/08* (2013.01); *C08F 230/08* (2013.01); *B01J 2219/00162* (2013.01); *B01J 2219/00182* (2013.01)

(58) Field of Classification Search
CPC ... C08F 216/14; C08F 230/08; C08F 230/085
See application file for complete search history.

(56) References Cited

U.S. PATENT DOCUMENTS

| | | | |
|---|---|---|---|
| 8,415,442 B2 | 4/2013 | Karjala et al. | |
| 8,729,186 B2 * | 5/2014 | Berbee | C08F 10/02 |
| | | | 525/197 |
| 8,871,876 B2 | 10/2014 | Berbee et al. | |
| 9,120,880 B2 | 9/2015 | Zschoch et al. | |
| 9,228,036 B2 | 1/2016 | Berbee et al. | |
| 9,334,348 B2 | 5/2016 | Berbee et al. | |
| 9,394,389 B2 | 7/2016 | Berbee et al. | |
| 9,944,733 B2 * | 4/2018 | Berbee | C08L 23/08 |
| 2003/0114607 A1 | 6/2003 | Donck | |
| 2016/0083568 A1 | 3/2016 | den Doelder et al. | |
| 2016/0090476 A1 | 3/2016 | den Doelder et al. | |
| 2016/0297904 A1 | 10/2016 | Berbee et al. | |
| 2016/0297905 A1 | 10/2016 | Berbee et al. | |
| 2016/0304638 A1 | 10/2016 | Den Doelder et al. | |

FOREIGN PATENT DOCUMENTS

| | | |
|---|---|---|
| WO | 0001740 A2 | 1/2000 |
| WO | 0168723 A2 | 9/2001 |
| WO | 0214379 A1 | 2/2002 |
| WO | 2013059042 A1 | 4/2013 |
| WO | 2013078018 A2 | 5/2013 |
| WO | 2014106067 A1 | 7/2014 |
| WO | 2015200430 A1 | 12/2015 |

OTHER PUBLICATIONS

Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.

* cited by examiner

PROCESS FOR MAKING HIGH PRESSURE FREE RADICAL ETHYLENE COPOLYMERS

REFERENCE TO RELATED APPLICATIONS

This application claims the benefit of U.S. Provisional Application 62/354,457 filed Jun. 24, 2016, and incorporated herein by reference.

BACKGROUND

Autoclave and tubular reactor systems can be used for the production of high pressure homo- and copolymers. High molecular weight, normally solid copolymers of ethylene and unsaturated functional comonomers, such as among others vinyl acetate (VA), ethyl acrylate (EA), n-butyl vinyl ether (nBVE), allyl alcohol and vinyl trimethoxy silane (VTMOS) are well known. The reactivity of the selected comonomer relative versus ethylene can vary from very high, for instance for ethyl acrylate, to equal to, for instance for vinyl acetate or to very low, for instance for n-butyl vinyl ether. The autoclave reactor will make, due to backmixing conditions, a homogeneous copolymer within a reaction zone, while the homogeneity of the copolymer made within a tubular reactor zone will be heterogeneous in case of high reactive comonomer and will be more homogeneous when monomers with reactivity equal to or lower than ethylene are used. Furthermore a tubular reactor has a much higher surface to volume ratio by which it has a much higher heat transfer capability and therefore higher conversion capability.

The properties of the produced copolymer can be affected by the type and level of the selected comonomer, for instance the use of vinyl acetate will affect the polymer softening point, the final melting and the adhesion properties, while for instance vinyltrimethylmethoxy silane comonomer is used to affect the crosslinking behavior in W&C applications. Due to the long chain branching mechanism in high pressure polymerization, initially formed polymer molecules can be reinitiated, by which polymer molecules can consist of polymer chains made in different reaction zones and/or at different reaction conditions within a tubular reactor zone. Typically this leads to inhomogeneous comonomer build-in structures when highly reactive comonomers are used in a tubular reactor, while comonomers with reactivity equal, similar, or lower than ethylene lead to the production of more homogeneous copolymers in the autoclave and/or tubular reactor processes.

Large polymer molecules can have numbers of carbon atoms varying from 10,000 to in excess of 100,000. These large polymer molecules consist of a backbone and chain segments (long chain branches) with different priorities and seniorities. For functionality of polymer molecules the comonomer levels in the chain segments with the lowest priorities and seniorities are of importance due to their position in the outer sphere of the polymer molecule. FIG. 5 depicts the final structure of larger polymer molecules, which are formed by adding long chain branches to a starting polymer backbone. Typically initial backbones and long chain branches are long, but long chain branches added further along the reactor are becoming smaller due to the increasing LCB branching frequency, as depicted in FIG. 4.

When assuming two polymerization phases the shorter long chain branches located in the outer layer or outer sphere of a large polymer molecule are typically formed during the second polymerization phase, while polymer segments located inside a large polymer molecule are typically formed during the first polymerization phase. The comonomer concentrations applied in the first and second polymerization phase will affect the level as well the distribution of comonomer build-in in larger molecules. Polymer properties like adhesion in case of for instance vinyl acetate or crosslinking in case of VTMOS will be positively influenced by the higher level of comonomer in the outer sphere of the larger polymer molecules and/or smaller polymer molecules and can potentially match the performance of copolymers with higher but more homogeneous distributions of comonomers.

This invention enables the production of copolymers with diversified and/or controlled distributions of the functional comonomer in the copolymer, when applying comonomers with reactivity equal, similar or lower than ethylene in tubular and/or autoclave reactor systems. The inventive distributions of comonomers with reactivity equal, similar or lower than ethylene leads to diversified and improved properties in applications such as adhesive film, adhesives and improved crosslinking in wire and cable applications, etc.

SUMMARY OF INVENTION

A high pressure polymerization process to form an ethylene-based polymer, the process comprising at least the following step:

polymerizing a reaction mixture comprising ethylene and at least one comonomer, using a reactor system comprising a reactor configuration, and the following:

(A) at least two reaction zones, a first reaction zone (reaction zone 1) and an ith reaction zone (reaction zone i where i≥2), (B) at least two ethylene-based feed streams, each feed stream comprising a percentage of the total make-up ethylene fed to the polymerization process, and wherein a first ethylene-based feed stream is sent to reaction zone 1 and a second ethylene-based feed stream is sent to reaction zone i;

(C) a control system to control the percentage of the total make-up ethylene in the ethylene-based feed stream sent to reaction zone 1, and the percentage of the total make-up ethylene in the ethylene-based feed stream sent to reaction zone i, and wherein the ratio (Q) of the molar concentration of the at least one comonomer fed to the first reaction zone, to the molar concentration of comonomer in the sum of all ethylene-based feeds to the reactor configuration, meets the following Equation 1: $0.23\ln(r1)-2.16 \leq Q \leq -0.25\ln(r1)+2.15$ (Equation 1); and wherein the comonomer has a reactivity ratio (r1) as follow: $0.3 \leq r1 \leq 5.0$, and a boiling point (1 atm)$\leq 150°$ C.

The invention also provides an ethylene-based polymer that comprises the following properties: for the at least one comonomer, the ratio (y) of "the comonomer content of the polymer fraction at the peak temperature in the last reaction zone" to "the comonomer content of the total polymer produced" meets the following relationship: $0.16\ln(r1)+0.72 < y < 0.079\ln(r1)+1.27$, where r1 is the reactivity ratio of the comonomer In a further embodiment, reactivity ratio (r1) is as follows: $0.6 \leq r1 \leq 4.5$, or $0.7 \leq r1 \leq 4.5$.

DETAILED DESCRIPTION

Figure 1:
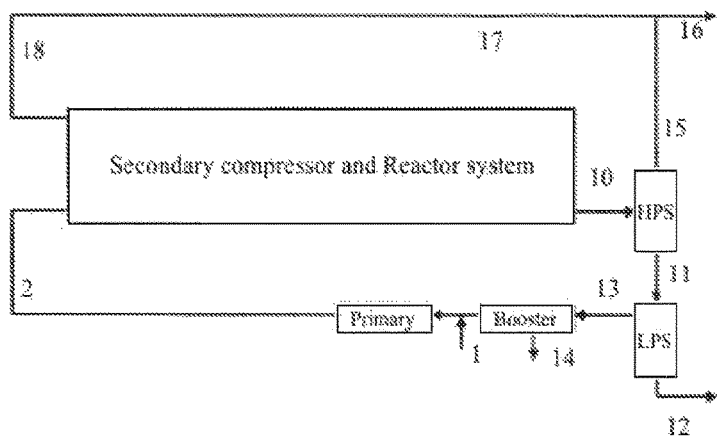
FIG. 1: Generalized flow scheme for a high pressure polymerization process.

As discussed above, a high pressure polymerization process to form an ethylene-based polymer, the process comprising at least the following step:

polymerizing a reaction mixture comprising ethylene and at least one comonomer, using a reactor system comprising a reactor configuration, and the following:

(A) at least two reaction zones, a first reaction zone (reaction zone 1) and an ith reaction zone (reaction zone i where i≥2), (B) at least two ethylene-based feed streams, each feed stream comprising a percentage of the total make-up ethylene fed to the polymerization process, and wherein a first ethylene-based feed stream is sent to reaction zone 1 and a second ethylene-based feed stream is sent to reaction zone i;

(C) a control system to control the percentage of the total make-up ethylene in the ethylene-based feed stream sent to reaction zone 1, and the percentage of the total make-up ethylene in the ethylene-based feed stream sent to reaction zone i, and wherein the ratio (Q) of the molar concentration of the at least one comonomer fed to the first reaction zone, to the molar concentration of comonomer in the sum of all ethylene-based feeds to the reactor configuration, meets the following Equation 1: $0.23\ln(r1)-2.16 \leq Q \leq -0.25\ln(r1)+2.15$ (Equation 1); and wherein the comonomer has a reactivity ratio (r1) as follow: $0.3 \leq r1 \leq 5.0$, and a boiling point (1 atm)≤150° C.

In one embodiment, the Q value is as follows: $0.23\ln(r1)-2.0$ (or $-2.3) \leq Q \leq -0.25\ln(r1)+1.90$ (or 2.3) (Equation 1a).

In one embodiment, the reactivity ratio (r1) is from 0.3, or 0.4, or 0.5, or 0.6, or 0.7 to 4.5, or 4.0.

In one embodiment, the reaction mixture comprises two or more comonomers, and each comonomer meets Equation 1.

In one embodiment, the comonomer comprises at least one heteroatom, or is a polyene or a C8 or higher alpha-olefin.

In one embodiment, the comonomer has reactivity ratio (r1) as follows $0.3 \leq r1 \leq 4.5$, $0.4 \leq r1 \leq 4.5$, $0.5 \leq r1 \leq 4.5$, $0.6 \leq r1 \leq 4.5$, $0.3 \leq r1 \leq 4.0$, $0.4 \leq r1 \leq 4.0$, $0.5 \leq r1 \leq 4.0$, $0.6 \leq r1 \leq 4.0$, $0.7 \leq r1 \leq 4.5$ or $0.7 \leq r1 \leq 4.0$.

In one embodiment the comonomer, comprises at least one heteroatom or a polyene or a C8 or higher alpha-olefin, has a reactivity ratio (r1) as follow: $0.3 \leq r1 \leq 4.5$, $0.4 \leq r1 \leq 4.5$, $0.5 \leq r1 \leq 4.5$, $0.6 \leq r1 \leq 4.5$, $0.3 \leq r1 \leq 4.0$, $0.4 \leq r1 \leq 4.0$, $0.5 \leq r1 \leq 4.0$, $0.6 \leq r1 \leq 4.0$, $0.7 \leq r1 \leq 4.5$ or $0.7 \leq r1 \leq 4.0$.

In one embodiment the comonomer, comprises at least one heteroatom or a polyene or a C8 or higher alpha-olefin has a maximum boiling point (1 atm)≤160° C., ≤150° C., ≤140° C., ≤130° C., ≤120° C., ≤110° C., ≤100° C. or ≤90° C.

In one embodiment, the comonomer is selected from the following: a silane functionalized compound (e.g., vinyltrimethoxysilane and vinyltrimethylsilane), a diallylether, a diene (e.g., octadiene, decadiene), a C8 or higher alpha-olefin, or a vinyl ester. In one embodiment, the comonomer is a vinyl ester. In one embodiment, the comonomer is selected from butyl vinyl ether, octene-1, vinyl acetate, vinyltrimethoxysilane, vinyltrimethylsilane, vinyl chloride, vinyl butyrate, allyl alcohol, or vinyl fluoride. In one embodiment, the comonomer is a vinyl acetate. In one embodiment, the comonomer is selected from the following: a silane functionalized compound (e.g., vinyltrimethoxysilane and vinyltrimethylsilane) or vinyl acetate. In one embodiment, the reaction mixture comprises one comonomer.

In one embodiment, the ratio (Q) of "the molar concentration of the comonomer fed to the first reaction zone" to "the molar concentration of comonomer in the sum of all ethylene-based feeds to the reactor" meets the following Equation 2 or Equation 3: $Q \leq 0.51\ln(r1)-1.32$ (Equation 2); $Q > -0.51\ln(r1)+1.32$ (Equation 3). In a further embodiment, reactivity ratio (r1) is as follows: $0.6 \leq r1 \leq 4.5$, or $0.7 \leq r1 \leq 4.5$.

In a one embodiment, the Q meets the following Equation 2a or Equation 3a: $Q \leq 0.51\ln(r1)-1.1$ (or 1.2) (Equation 2a); $Q > -0.51\ln(r1)+1.1$ (or 1.2) (Equation 3a).

In one embodiment, the ratio (Q) of the molar concentration of the comonomer fed to the first reaction zone to the molar concentration of comonomer in the sum of all ethylene-based feeds to the reactor meets the following Equation 4 or Equation 5: $Q \leq 0.362\ln(r1)-1.024$ (Equation 4), $Q > -0.368\ln(r1)+1.04$ (Equation 5). In a further embodiment, reactivity ratio (r1) is as follows: $0.6 \leq r1 \leq 4.5$, or $0.7 \leq r1 \leq 4.5$. Each concentration is the mole % of comonomer, based on total moles of components in the ethylene-based feed.

In one embodiment, the ratio (Q) of the molar concentration of the comonomer fed to the first reaction zone to the molar concentration of comonomer in the sum of all ethylene-based feeds to the reactor meets the following Equation 6: $0.34\ln(r1)-1.94 \leq Q \leq -0.094\ln(r1)+1.81$ (Equation 6). In a further embodiment, reactivity ratio (r1) is as follows: $0.6 \leq r1 \leq 4.5$, or $0.7 \leq r1 \leq 4.5$. Each concentration is the mole % of comonomer, based on total moles of components in the ethylene-based feed.

In one embodiment, the control system comprises a valve on a line, through which an ethylene-based feed stream is delivered to a reaction zone. In a further embodiment, the valve is a three-port valve.

In one embodiment, the control system comprises a valve control system controlling the flow ratio of one or more ethylene-based feed streams. As used herein, a "valve control system" refers to a control system of one or more two-way or multi-ways valve controlling the flow ratio of one or more ethylene feed streams.

In one embodiment, the process takes place in a reactor configuration comprising a tubular reactor, an autoclave reactor, or a combination of a tubular reactor and an autoclave reactor. In one embodiment, the total ethylene based feed flow to the reactor configuration is from 30 to 400 tons per hr, or from 50 to 350 tons per hour.

The invention also provides an ethylene-based polymer that comprises the following properties: for the at least one comonomer, the ratio (y) of "the comonomer content of the polymer fraction at the peak temperature in the last reaction zone" to "the comonomer content of the total polymer produced" meets the following relationship: $0.16\ln(r1)+0.72<y<0.079\ln(r1)+1.27$, where r1 is the reactivity ratio of the comonomer. In a further embodiment, reactivity ratio (r1) is as follows: $0.6 \le r1 \le 4.5$, or $0.7 \le r1 \le 4.5$.

In one embodiment, y is as follows: $0.16\ln(r1)+0.65$ [or $0.79$]$<y<0.079\ln(r1)+1.15$ [or $1.40$], where r1 is the reactivity ratio of the comonomer. In a further embodiment, reactivity ratio (r1) is as follows: $0.6 \le r1 \le 4.5$, or $0.7 \le r1 \le 4.5$.

The following embodiments apply to an inventive process and an inventive ethylene-based polymer.

In one embodiment, the ethylene-based polymer comprises the following properties: for the at least one comonomer, the ratio (y) of "the comonomer content of the polymer fraction at the peak temperature in the last reaction zone" to "the comonomer content of the total polymer produced" meets the following relationship: $0.16\ln(r1)+0.72<y<0.079\ln(r1)+1.27$, where r1 is the reactivity ratio of the comonomer. In a further embodiment, reactivity ratio (r1) is as follows: $0.6 \le r1 \le 4.5$, or $0.7 \le r1 \le 4.5$.

In one embodiment, y is as follows: $0.16\ln(r1)+0.65$ [or $0.79$]$<y<0.079\ln(r1)+1.15$ [or $1.40$], where r1 is the reactivity ratio of the comonomer. In a further embodiment, reactivity ratio (r1) is as follows: $0.6 \le r1 \le 4.5$, or $0.7 \le r1 \le 4.5$.

In one embodiment, the ethylene-based polymer comprises the following properties:

a) for the at least one comonomer, "the ratio (y) of "the comonomer content of the polymer fraction at the peak temperature in the last reaction zone" to "the comonomer content of the total polymer produced" meets the following relationship: $y>0.079\ln(r1)+1.14$, where r1 is the reactivity ratio of the comonomer;

b) for the at least one comonomer, the ratio (y) of "the comonomer content of the polymer fraction at the peak temperature in the last reaction zone" to "the comonomer content of the total polymer produced" meets the following relationship $y<0.18\ln(r1)+0.79$, where r1 is the reactivity ratio of the comonomer. In a further embodiment, reactivity ratio (r1) is as follows: $0.6 \le r1 \le 4.5$, or $0.7 \le r1 \le 4.5$.

In one embodiment, w is as follows: $y>0.079\ln(r1)+1.03$ [or $1.25$], and $y<0.18\ln(r1)+0.71$ [or $0.87$], where r1 is the reactivity ratio of the comonomer. In a further embodiment, reactivity ratio (r1) is as follows: $0.6 \le r1 \le 4.5$, or $0.7 \le r1 \le 4.5$.

In one embodiment, the ethylene-based polymer comprises the following properties:

a) for the at least one comonomer, "the ratio (y) of "the comonomer content of the polymer fraction at the peak temperature in the last reaction zone" to "the comonomer content of the total polymer produced" meets the following relationship: $y>0.079\ln(r1)+1.10$, where r1 is the reactivity ratio of the comonomer;

b) for the at least one comonomer, the ratio (y) of "the comonomer content of the polymer fraction at the peak temperature in the last reaction zone" to "the comonomer content of the total polymer produced" meets the following relationship $y<0.18\ln(r1)\ 0.85$, where r1 is the reactivity ratio of the comonomer. In a further embodiment, reactivity ratio (r1) is as follows: $0.6 \le r1 \le 4.5$, or $0.7 \le r1 \le 4.5$.

In one embodiment the ratio (d) of the comonomer (i) content of the n-hexane extractables of the whole polymer to the comonomer (i) content of the whole polymer meets the following relationship: $0.16\ln(r1)+0.72<d<0.079\ln(r1)+1.27$, where r1 is the reactivity ratio of the comonomer (i).

In one embodiment, the ethylene-based polymer comprises the following properties: for the at least one comonomer, the ratio (w) of "the comonomer content of the first 50 wt % polymer (based on the total amount of polymer produced) produced in the reactor system" to "the comonomer content of the last 50 wt % of the polymer produced in the reactor system" meets the following relationship: $-0.0052\ln(r1)+0.55<w<-0.37\ln(r1)+1.82$; wherein r1 is the reactivity ratio of the comonomer. In a further embodiment, reactivity ratio (r1) is as follows: $0.6 \le r1 \le 4.5$, or $0.7 \le r1 \le 4.5$.

In one embodiment, w is as follows: $-0.0052\ln(r1)+0.50$ [or $0.60$]$<w<-0.37\ln(r1)+1.64$ [or $2.00$]; wherein r1 is the reactivity ratio of the comonomer. In a further embodiment, the reactivity ratio (r1) is as follows: $0.6 \le r1 \le 4.5$, or $0.7 \le r1 \le 4.5$.

In one embodiment, the ethylene-based polymer comprises one of the following properties: a) for the at least one comonomer, the ratio (w) of "the comonomer content of the first 50 wt % polymer produced in the reactor system" to "comonomer content of "the comonomer content of the last 50 wt % polymer produced in the reactor system" meets the following relationship: $w>-0.35\ln(r1)+1.53$; wherein r1 is the reactivity ratio of the comonomer; b) for each comonomer, the ratio (w) of "the comonomer content of the first 50 wt % polymer produced in the reactor system" to "comonomer content of "the comonomer content of the last 50 wt % polymer produced in the reactor system" meets the following relationship: $w<0.043\ln(r1)+0.70$; wherein r1 is the reactivity ratio of the comonomer. In a further embodiment, reactivity ratio (r1) is as follows: $0.6 \le r1 \le 4.5$, or $0.7 \le r1 \le 4.5$.

In one embodiment, w is as follows: $w>-0.35\ln(r1)+1.38$ [or $1.68$]; wherein r1 is the reactivity ratio of the comonomer; and $w<0.043\ln(r1)+0.63$ [or $0.77$]; wherein r1 is the reactivity ratio of the comonomer. In a further embodiment, reactivity ratio (r1) is as follows: $0.6 \le r1 \le 4.5$, or $0.7 \le r1 \le 4.5$.

In one embodiment, the ethylene-based polymer comprising one of the following properties: a) for the at least one comonomer, the ratio (w) of "the comonomer content of the first 50 wt % polymer produced in the reactor system" to "comonomer content of "the comonomer content of the last 50 wt % polymer produced in the reactor system" meets the following relationship: $w>-0.35\ln(r1)+1.53$; wherein r1 is the reactivity ratio of the comonomer; b) for each comonomer, the ratio (w) of "the comonomer content of the first 50 wt % polymer produced in the reactor system" to "comonomer content of "the comonomer content of the last 50 wt % polymer produced in the reactor system" meets the following relationship: $w<0.043\ln(r1)+0.70$; wherein r1 is the reactivity ratio of the comonomer. In a further embodiment, reactivity ratio (r1) is as follows: $0.6 \le r1 \le 4.5$, or $0.7 \le r1 \le 4.5$.

In one embodiment, w is as follows: $w>-0.35\ln(r1)+1.38$ [or $1.68$]; wherein r1 is the reactivity ratio of the comonomer; and $w<0.043\ln(r1)+0.63$ [or $0.77$]; wherein r1 is the reactivity ratio of the comonomer. In a further embodiment, reactivity ratio (r1) is as follows: $0.6 \le r1 \le 4.5$, or $0.7 \le r1 \le 4.5$.

In one embodiment, the at least one comonomer is a vinyl acetate, and/or wherein the ethylene-based polymer has an overall crystallinity from $-1.03*(V_f)+47.7$ to $-1.03*(V_1)+47.7$, where $V_1$ and $V_f$ represent the vinyl acetate weight percent of the first 50 wt % of the polymer produced and the 50 wt % of the last polymer produced, respectively; and wherein each wt % is based on the total weight of copolymer.

The invention also provides a composition comprising an inventive ethylene-based polymer as described herein. In one embodiment, the composition further comprises a silanol condensation catalyst and/or a crosslinking agent, and further a peroxide. In a further embodiment, the comonomer comprises one or more hydrolyzable silane groups.

The invention also provides a moisture-crosslinkable composition, comprising an inventive ethylene-based polymer as described herein, and wherein the comonomer comprises one or more hydrolyzable silane groups; and wherein the composition optionally comprises a silanol condensation catalyst.

The invention also provides a wire or cable configuration comprising at least one component formed from an inventive composition described herein.

The invention also provides crosslinked article comprising at least one component formed from an inventive composition described herein.

An inventive process may comprise a combination of two or more embodiments described herein. An inventive ethylene-based polymer may comprise a combination of two or more embodiments described herein. An inventive composition may comprise a combination of two or more embodiments described herein. An inventive article may comprise a combination of two or more embodiments described herein.

Process

For producing a highly branched ethylene-based polymer, a high pressure, free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The beginning of a reaction zone, for either type of reactor, is typically defined by the injection and/or activation of a free radical source, and the side injection of, ethylene, CTA (chain transfer agent or telomer), comonomer(s), and any combination thereof. A high pressure process can be carried out in autoclave or tubular reactors having one or more reaction zones, or in a combination of autoclave and tubular reactors, each comprising one or more reaction zones.

In one embodiment, the inventive process takes place in a reactor configuration comprising a tubular reactor. In an embodiment, the inventive process takes place in a reactor configuration comprising at least one autoclave and/or tubular reactor. In one embodiment, the inventive process takes place in a reactor configuration comprising a tubular reactor and an autoclave reactor. In one embodiment, the tubular reactor is downstream from the autoclave reactor.

In one embodiment, from 20 to 60 wt %, further from 40 to 60 wt % of the total ethylene feed, is fed to the first reaction zone, and greater than 80 wt %, further greater than 90 wt % of the total comonomer feed, is fed to the first reaction zone. In one embodiment, from 50 to 80 wt % of the total ethylene feed, is fed to the first reaction zone, and greater than 80 wt %, further greater than 90 wt % of the total comonomer feed is fed to the first reaction zone. In one embodiment, from 20 to 70 wt %, further from 40 to 70 wt % of the total ethylene feed, is fed to the first and second reaction zones, and greater than 80 wt %, further greater than 90 wt % of the total comonomer feed is fed to the first and second reaction zones.

In one embodiment, from 50 to 80 wt % of the total ethylene feed, is fed to the first and second reaction zones, and greater than 90 wt % of the total comonomer feed is fed to the first and second reaction zones. In one embodiment, from 50 to 80 wt % of the total ethylene feed, is fed to the second and third reaction zones, and greater than 90 wt % of the total comonomer feed is fed to the second and third reaction zones. In one embodiment, from 30 to 60 wt % of the total ethylene feed, is fed to the third reaction zone, and greater than 70 or 80 wt % of the total comonomer feed is fed to the third reaction zone. In one embodiment, from 40 to 60 wt % of the total ethylene feed, is fed to the third and fourth reaction zones, and greater than 80 or 90 wt % of the total comonomer feed is fed to the third and fourth reaction zones.

Often a CTA is used to control molecular weight. In one embodiment, one or more CTAs are added to an inventive polymerization process. CTAs typically comprise at least one of the following groups: alkanes, aldehydes, ketones, alcohol, ether, esters, mercaptan or phosphine. In a further embodiment, a CTA comprises at least one group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, ISOPAR-C, -E, and -H (ExxonMobil Chemical Co.), and isopropanol. In one embodiment, the amount of CTA used is from 0.03 to 10 weight percent based on the weight of the total reaction mixture.

In one embodiment, in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1 is greater than or equal to than 1.0, or greater than 1.5, or greater than 2.

In one embodiment in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1 is less than 1.0, or less than 0.8, or less than 0.6, or less than 0.4.

In one embodiment, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range, and the conversion levels for autoclave reactors at the lower end of this range.

In one embodiment, the polymerization may take place in a tubular reactor as described in International Application No. PCT/US12/059469, filed Oct. 10, 2012 (now WO2013/059042). This patent application uses a multi-zone reactor, and describes alternate locations of feeding make-up (fresh) ethylene to control the ethylene to CTA ratio, and therefore polymer properties. Make-up ethylene may be simultaneously added in multiple locations, to achieve the desired ethylene to CTA ratio. In a similar way, addition of make-up CTA at addition points may be carefully selected to control polymer properties, as described in International Application No. PCT/US12/064284, filed Nov. 9, 2012 (now WO2013/078018). Make-up CTA may be simultaneously added in multiple locations, to achieve the desired CTA to ethylene ratio.

In one embodiment, the polymerization takes place in at least one tubular reactor. In a multi-reactor system, the autoclave reactor usually precedes the tubular reactor. The addition points and amounts of make-up ethylene, make-up CTA, and make-up comonomer, may be appropriately controlled, to achieve the desired ratios of CTA to ethylene in the feeds to, and/or in, the reaction zones. In one embodiment, the polymerization takes place in two reactors. In one embodiment, the polymerization takes place in one reactor with multiple or at least two reaction zones.

In one embodiment, the polymerization takes place in a reactor configuration comprising at least two reaction zones, reaction zone 1 and reaction zone i (i≥2), and wherein reaction zone i is downstream from reaction zone 1. In an embodiment, i is from 2 to 6, or from 2 to 5, or from 2 to 4. In an embodiment, i=2. In one embodiment, the total number of reaction zones=n. In a further embodiment, n is from 1 to 20, or from 1 to 10, or from 1 to 6. In a further embodiment, n is from 2 to 20, or from 2 to 10, or from 2 to 6.

In one embodiment, the ethylene-based polymer comprises ethylene and, optionally, one or more other comonomers, and preferably one comonomer. Comonomers include, but are not limited to, α-olefins, vinylacetate, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, 1-octene, 1-nonene, 1-decene, and 4 methyl-1-pentene and combinations thereof.

In one embodiment the comonomers comprise multifunctional vinyl containing components like polyenes, hydrocarbon dienes and/or multifuntional CTA comonomer. Polyenes and hydrocarbon dienes are able through reaction/incorporation of at least two functional groups to form connecting branches between two molecules by which they act as a rheology modifying agent. Multifunctional CTA comonomers are able to modify rheology by formation of additional long chain branches through incorporation by the vinyl group and initiation of a long chain branch through donation of a hydrogen atom by the CTA group followed by ethylene propagation at the remaining active radical. Furthermore polyenes or hydrocarbon dienes can be used as crosslinking agents. Incorporation as crosslinking agent through the first functionality increases the vinyl level in the produced polymer. This increased vinyl level in the produced polymer can be activated and used for crosslinking,
when processing the polymer in the final application, as for instance wire and cable etc.

A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers.

In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6, 6,9,9-hexamethyl-1,2,4,5-tetroxonane) available from United Initiators. See also International Publication Nos. WO 02/14379 and WO 01/68723. Photo-degradability of polymer can be enhanced by preferred incorporation of carbonyls in larger polymer molecules and more specifically in the internal backbones of these larger molecules. These preferred distributions can be established by the following four embodiments below. A process for forming an ethylene-based polymer may comprise a combination of two or more embodiments as described herein.

Additives and Applications

An inventive composition may comprise one or more additives. Additives include, but are not limited to, stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer. An inventive composition may further comprise at least one other polymer, in addition to an inventive ethylene-based polymer. Blends and mixtures of the inventive polymer with other polymers may be prepared.

The polymers, polymer blends and compositions of this invention may be employed in a variety of conventional thermoplastic fabrication processes, to produce useful articles, including (but not limited to) extrusion coatings onto various substrates; monolayer and multilayer films; molded articles, such as blow molded, injection molded, or rotomolded articles; coatings; fibers; and woven or non-woven fabrics. The polymers, polymer blends and compositions of this invention can be used in applications, which require photodegradable polymers over time. An inventive polymer may be used in a variety of films, including but not limited to, food packaging, consumer, industrial, agricultural (applications or films), lamination films, clarity shrink films, collation shrink films, stretch films, silage films, greenhouse films, fumigation films, liner films, stretch hood, heavy duty shipping sacks, pet food, sandwich bags, sealants, and diaper backsheets.

Wire and Cable Applications

The polymers of this invention, with or without additives (to make blends or compositions), may be extruded onto a wire or cable to make a coated conductor (that is, the jacket, insulation or semi-conductive shield layer of a low-, medium-, high- or extra-high voltage wire or cable). Additives include (but are not limited to) peroxides, silanol con-densation catalysts, conductive fillers, flame retardants, antioxidants, scorch retardants, tree retardants, and ultraviolet stabilizers. Any known process may be used to make the wires and cables of this invention with the polymers, polymer blends and compositions of this invention (typically by extrusion). The polymer layers of the wire and cable may be thermoplastic or crosslinked using any method including, but not limited to, peroxide crosslinking, radiation crosslinking and moisture crosslinking. In the case of peroxide-crosslinkable compositions, these include (but are not limited to) the following triple extrusion processes that are used to manufacture medium- to extra high-voltage cable cores: vertical continuous vulcanization (VCV), catenary continuous vulcanization (CCV) and Mitsubishi Dainichi continuous vulcanization (MDCV). In the case of moisture-crosslinkable compositions, polymers containing hydrolysable silane groups may be combined with optional silanol condensation catalysts and/or other additives to form substantially homogeneous mixtures which, in turn, are extruded onto the wire or cable. The mixing usually occurs in an extruder using equipment, conditions and protocols well known in the art. After extrusion onto the wire or cable, the coated conductor is exposed to moisture (to crosslink the polymer composition) at ambient conditions or in a sauna/water-bath often operated at 90° C. The components of the composition can be mixed or blended in any manner and using any equipment. The mixing or blending may be done at, below or above the melting temperature of the polymer. The additives can be added in any manner, including soaking and mixing. In one embodiment, the additives are blended with one another and then added to the polymer. In one embodiment, the additives are added individually. The additives can be soaked or mixed with the polymer prior to melt processing or extrusion to make the cables. In an embodiment, all the additives are melt-blended in one step. In another embodiment, all the additives are melt-blended in one step as part of the cable extrusion process, without a need to first prepare a compound prior to use during cable extrusion. In an embodiment, the additives are premixed with the solid polymer very quickly in a "turbo-mixer" prior to being discharged into the extruder via a feed hopper.

The polymer used to make insulation or jacket of wire and cable constructions will have the following attributes: a) Wt % vinyltrialkoxysilane copolymerized with ethylene: 0.5 to 5.0 wt %, preferably 0.7 to 4.0 wt %, more preferably 0.9 to 3.0 wt %, most preferably 1.1 to 2.5 wt %; b) Optional Third monomer copolymerized with ethylene and vinyltrialkoxysilane: Acrylate or vinyl acetate, at 0 to 70 wt %, preferably 0 to 40 wt %, more preferably 0 to 30 wt %, most preferably 0 to 20 wt %; c) Melt Index, $I_2$, of ethylene-silane reactor copolymer: 0.3 to 30.0 dg/min, preferably 0.5 to 15.0 dg/min, more preferably 0.7 to 10.0 dg/min, most preferably 0.9 to 5.0 dg/min; and d) Polydispersity: Any range of molecular weight distribution. In some cases, broad molecular weight distribution may be better than narrow, for instance, when flame-retardant fillers, conductive fillers, etc., are contained in the formulations. As mentioned above, the polymer compositions used to make wire and cable insulation or jacket may contain one or more of the following: Silanol Condensation Catalysts (Lewis or Bronsted acids/bases, as and when necessary to effect crosslinking), Fillers (conductive materials, flame retardants, etc.), and various other additives (antioxi-dants, ultraviolet stabilizers, peroxides, etc.). After ultimate (moisture) crosslinking, the Hot Creep of Polymeric Compositions will be <175%, preferably <100%, more preferably <75%, most preferably <50%.

Definitions

Unless stated to the contrary, implicit from the context, or customary in the art, all parts and percents are based on weight, and all test methods are current as of the filing date of this application. The term "composition," as used herein, includes a mixture of materials which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers. The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the interpolymer, and a comonomer as the only monomer types.

The term "hydrocarbon," as used herein, refers to an organic molecule containing only hydrogen and carbon atoms. The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one-embodiment, the alkyls each have 1 to 20 carbon atoms. The term "heteroatom" refers to atoms other than hydrogen and carbon.

The phrase "molar concentration of a component (for example, molar concentration of a comonomer)," as used herein, refers the mole amount of the component in an ethylene-based stream(s), based on the total moles of components in the same ethylene-based stream(s).

The terms "ethylene feed stream" or "ethylene based feed" or "ethylene based feed stream," or "ethylene feed flow," as used herein, refer to a feed stream to a reaction zone, and which contains a majority amount of ethylene, based on the molar amount of all of the components in the feed stream, and at least one comonomer. Optionally one of more chain transfer agents, other comonomers, other process components (like lubrication oil, solvent, etc.) and/or impurities (as for instance initiator degradation products) might be present in the feed stream. The term "total ethylene based feed flow", as used herein, refers the sum of all ethylene-based feed flows fed to the reactor configuration.

The term "ethylene-based feed components," as used herein, refer to ethylene (make-up and/or recycled), at least one comonomer, and optionally CTA (make-up and/or recycled), solvent (make-up and/or recycled), other comonomer(s) (make-up and/or recycled) and/or other components (for example, including, but not limited to, make-up and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (make-up and/or recycled), and optionally CTA (make-up and/or recycled), solvent (make-up and/or recycled), comonomer(s) (make-up and/or recycled) and/or other components selected from the following: make-up and/or recycled lubrication oil(s), antioxidant(s), ethane, methane and/or initiator dissociation products. In another embodiment, the ethylene-based feed components comprise the following: ethylene (make-up and/or recycled), and optionally CTA (make-up and/or recycled), solvent (make-up and/or recycled), comonomer(s) (make-up and/or recycled) and/or other components selected from the following: make-up and/or recycled lubrication oil(s), antioxidant(s), ethane, methane, initiators (for example, oxygen) and/or initiator dissociation products.

The term "polymer conversion" or "polymer conversion level," is defined by the equation:

$$\text{Polymer conversion (wt \%)} = \frac{M_{Polymer\ output}\left(\frac{kg}{hr}\right)}{\text{Total Ethylene based feed flow}\left(\frac{kg}{hr}\right)} \times 100\%.$$

The term "ethylene conversion" or "ethylene conversion level," is defined by the equation:

$$\text{Ethylene conversion (wt \%)} = \frac{M_{Ethylene\ converted}\left(\frac{kg}{hr}\right)}{\text{Total Ethylene based feed flow}\left(\frac{kg}{hr}\right)} \times 100\%.$$

The term "comonomer conversion" or "comonomer conversion level," is for each comonomer (i) defined by the equation:

$$\text{Comonomer (}i\text{) conversion (wt \%)} = \frac{M_{comonomer\ (i)\ converted}\left(\frac{kg}{hr}\right)}{\text{Total Comonomer (}i\text{) feed flow}\left(\frac{kg}{hr}\right)} \times 100\%.$$

The term "converted" means incorporated in the formed copolymer chain.

The term "ethylene-based polymer" refers to a polymer that comprises a majority amount of polymerized ethylene, based on the weight of the polymer, and, optionally, at least one comonomer. The term "ethylene-based copolymer" refers to a copolymer that comprises a majority amount of polymerized ethylene, based on the weight of the copolymer, and a comonomer as the only monomer types.

The term "reactor system," as used herein, refers to the devices used to polymerize and isolate a polymer. Such devices include, but are not limited to, one or more reactors, reactor pre-heater(s), monomer-reactor cooling device(s), Secondary compressor(s) (or Hyper compressor system(s)), Primary compressor(s), and/or Booster compressor(s).

The term "reactor configuration," as used herein, refers to one or more reactors, and optionally one or more reactor pre-heaters, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the first reaction zone.

The term "control system," as used herein, in reference to a polymerization process, refers to an apparatus used to control and/or to adjust the composition and/or flow of a feed to a reaction zone. Examples of a control system include, but are not limited to, one or more valves (each having an inlet and an outlet), and one or more multi-way valves (for example, a three-way or four-way valve). For example, in one embodiment, a valve-control system controls the flow ratio of one or more ethylene-based feed streams, for example, the system controls the distribution of make-up ethylene, or recycle ethylene, or make-up comonomer(s), or make-up CTA, over two or more feed streams to the reactor configuration. Examples of a valve-control system is a system with two or more lines, each with an independent control valve or a multiple way control valve, distributing an inlet stream over two or more outlet streams.

The terms "analyzer", or "on-line analyzer", or "at-line analyzer," as used, in reference to a polymerization process and/or a polymer isolation, refers to a device, incorporated with a reactor configuration, that measures the concentration of a reagent (for example, comonomer(s) and/or CTA) and/or a polymer property (for example, comonomer content, melt strength or melt elasticity). Examples include, but are not limited to, Gas Chromato-gram apparatus, Infrared Detector apparatus, and typical laboratory apparatus to measure melt elasticity, melt strength, G', optical property, and other properties.

The term "high pressure, free radical polymerization process," as used herein, refers to a free radical polymerization process carried out at an elevated pressure of at least 1000 bar (100 MPa).

The term "reaction zone," as used herein, refers to a zone in a reactor, where the polymerization is first initiated by the addition of radicals or components which dissociate into, and/or generate, radicals. A reaction zone ends at the point where there is a new feed of radicals and/or components, which dissociate into, and/or generate, radicals, and optionally a feed of make-up and/or recycled ethylene and/or other components like CTA's, and/or comonomers. The term "first reaction zone," as used herein, refers to the first reactor zone where the polymerization is first initiated by the addition of radicals or components which dissociate into, and/or generate, radicals. The first reaction zone ends at the point where there is a new feed of radicals and/or components, which dissociate into and/or generate, radicals, and optionally a feed of make-up and/or recycled ethylene and/or comonomers and/or other components like CTA's. The terms "subsequent reaction zone," "sequential reaction zone," or "reaction zone located downstream of the first reaction zone," or "ith reaction zone," or similar terms, as used herein, refer to a reactor zone which receives ethylene and polymer from a previous reactor zone, and where radicals or components, which dissociate into and/or generate, radicals, are added at the inlet of the subsequent (or sequential) reactor zone. The subsequent (or sequential) reaction zone ends at the point where there is a new feed of radicals and/or components, which dissociate into and/or generate, radicals, and optionally a feed of make-up and/or recycled ethylene and/or comonomer(s) and/or other components like CTA's; however, the nth reaction zone ends at the position of a pressure control device of the reactor system. The number of subsequent (or sequential) reaction zones is (n–1), where n is the total number of reaction zones.

The term "peak temperature" or similar terms, as used herein, refers to the highest temp. measured in a reaction zone, for example, in an autoclave reaction zone (typically, noted as a maximum zone and or control temperature), and in a tubular reaction zone (typically noted as a peak temperature).

The term "make-up," when used herein, in reference to a reactant (i.e., "make-up ethylene," "make-up comonomer," "make-up CTA"), refers to reactant provided to compensate for the reactant consumed by the polymerization and/or lost through, for example, condensed and removed from the polymerization process, and residual ethylene in the polymer.

In one embodiment, Hyper compressor system comprises one or more pressure balancing lines, and the pressure balancing lines are located in the interstage and/or discharge of the Hyper compressor system. Further these lines affect the composition of the main interstage and/or compressor discharge flows by less than 5 wt % or, less than 3 wt % or less 2 wt % or less than 1 wt %, in each compression step using the pressure balancing lines. A "pressure balancing line" refers to a connecting line with a limited flow capacity between two main compression discharge lines, and is used to reduce the pressure pulsation in the two main compression discharge lines.

In one embodiment the inlet pressure of the first reaction zone is less than, or equal to, 4000 bar, or ≤3600 bar, or ≤3200 bar, or ≤3000 bar, or ≤2800 bar, or ≤2600 bar, or ≤2400 bar, or ≤2200 bar, or ≤2000 bar, or ≤1800 bar, or ≤1600 bar.

In one embodiment, the suction, interstage and discharge ethylene based feed flows are each handled by single flow lines. In one embodiment, the suction, interstage and discharge ethylene based flows are each handled by a flow line system comprising single and/or parallel flow lines.

The terms "Hyper compressor system" or "Secondary compressor system," "Hyper comp. system," or similar terms, as used herein, refers to a device that compresses a feed stream; for example, at least one of the following: a) the ethylene-based components coming from the HPR (High Pressure Recycle), and/or b) the ethylene-based components, each coming from the Primary compressor system, each to a pressure level required to feed the reactor at its inlet pressure. This compression can take place in one or multiple compression stages, and can be combined with intermediate cooling. The Hyper compressor system comprises a reciprocating plunger compressor, and can consist of single or multiple compressor frame(s). A Hyper compressor system containing a single frame can also be called a "Hyper compressor system."

The term "hyper compressor throughput," and similar terms, as used herein, refer to the net amount of feed components, for example, ethylene-based feed components, compressed and fed to the reactor configuration. The hyper throughput is a function of the compression volume and the density of the feed components, for example, ethylene based components, at the suction side. The pressure and temperature conditions at the suction side of the hyper compressor will define the density of the feed components, for example, ethylene based components, to be compressed.

The term "plunger(s)," or "cylinder(s)" as used herein, refers to a reciprocating pressurization device, within a cylinder assembly, compressing a gaseous feed (for example, an ethylene based feed) from the suction pressure to the interstage pressure of the hyper compressor system, or from the interstage pressure to the final discharge pressure of the hyper compressor system. Typically the sizing of a plunger and a cylinder assembly are uniform within a compression stage (first or second) of a hyper compressor system, but differ between the first and second compression stages of a hyper compressor system. Each plunger is housed inside a cylinder assembly.

The term "plunger throughput of the hyper compressor system," or "cylinder throughput of the hyper compressor system," and similar terms, as used herein, refer to the net amount of feed components, for example, ethylene-based feed components, compressed and fed to the reactor configuration. The throughput is a function of the compression volume and the density of the feed components, for example, ethylene based components, at the suction side. In the case of a copolymerization, the density may vary as a function of the comonomer type and content in the ethylene-based feed.

The "Primary compressor system," or similar terms, as used herein, refers to a device that compresses the following: a) the make-up incoming ethylene, and/or b) the low pressure recycle coming from the Booster compression system, and/or c) the recycled compressor packing leaks, each to the pressure level required at the inlet side of the Hyper compressor system. This compression can take place in one or multiple compression stages, and can be combined with intermediate cooling. The Primary compressor system can consist of single or multiple compressor frames, and can be potentially combined with Booster compressor frame(s). A Primary compressor system generates one output flow. The output is the ethylene based flow from the low pressure separator(s) plus the make-up ethylene flow, and optionally recompressed packing leaks from the compressor system(s) used in polymerization. The Primary compressor system can consist of one or more Primary compressors. Typically a Primary compressor system compresses a flow from 40 bar to the discharge pressure of 300 bar. A Primary compressor system containing a single frame can also be called a "Primary compressor."

The phrase "output from a Primary compressor system," or "Primary compressor system output," or "the output of the Primary compressor system," or "ethylene based flow from the output of the Primary compressor system," or similar terms, as used herein, refer to the ethylene based flow from the low pressure separator(s) plus the make-up ethylene flow and optionally recompressed packing leaks from the compressor system(s) used in polymerization.

The "Booster compressor system," as used herein, is a device that compresses the following: a) the low pressure recycle coming from the LPS (Low pressure Separator), and b) optionally, the recycled compressor packing leaks, each to the pressure level required at the inlet side of the Primary compressor system. This compression can take place in one or multiple compression stages, and can be combined with intermediate cooling. A Booster compression system can consist of single or multiple compressor frames, and can be potentially combined with Primary compressor frame(s). A Booster compressor system containing a single frame can also be called a "Booster compressor." Typically a Booster compressor system compresses a flow, from 1 bar to the discharge pressure of 40 bar or to the feed pressure of the make-up ethylene. Components like solvent, lubrication oil, comonomer, chain transfer agent, etc., might condense as function of their boiling point and will be collected and removed in one or more compression stages of the booster compressor system.

The term "LCB frequency," as used herein, refers to the number of long chain branches (C6 and higher) formed per 500 ethylene molecules or 1000 carbon atoms incorporated in the formed polymer. The term "SCB frequency," as used herein, reflects the number of short chain branches (C1, C2, C3, C4 and C5) formed per 500 ethylene molecules or 1000 carbon atoms incorporated in the formed polymer.

The term "moisture crosslinkable" as used herein refers to a crosslinking reaction that occurs upon exposure to water. An example of a "moisture crosslinkable composition" is a composition comprising a copolymer containing one or more hydrolyzable silane groups, and wherein the composition optionally comprises a silanol condensation catalyst, and where the copolymer undergoes crosslinking reaction on exposure to water.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "con-sisting essentially of" excludes from the scope of any succeeding recitation any other com-ponent, step, or procedure, excepting those that are not essential to operability. The term "consisting of" excludes any component, step, or procedure not specifically listed.

Test Methods
Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index (12 or 12) was measured in accordance with ASTM D 1238-10, Condition 190° C./2.16 kg, Method A, and was reported in grams eluted per 10 minutes.

Nuclear Magnetic Resonance ($^{13}$C NMR)

Samples were prepared by adding approximately "3 g" of a "50/50 mixture of tetrachloroethane-d2/orthodichloroben-zene, containing 0.025 M Cr(AcAc)$_3$," to a "0.25 to 0.40 g" polymer sample, in a 10 mm NMR tube. Oxygen was removed from the sample by purging the tube headspace with nitrogen. The samples were dissolved and homog-enized by heating the tube and its contents to 145-150° C. using a heating block and heat gun. Each sample was visually inspected to ensure homogeneity. All data were collected using a Bruker 400 MHz spectrometer. The data was acquired using a six second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were inter-nally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value.

Total carbonyls are all carbonyls including those from comonomers, chain transfer agents, esters, and so forth. When determining the overall (or total) carbonyl content, including carbonyl derived from "carbonyl-containing comonomers (for example, acrylates and vinyl acetate)," the signal frequencies corresponding to such compounds are also considered. Such frequencies are known by those or ordinary skilled in the art.

Nuclear Magnetic Resonance ($^1$H NMR)
Sample Preparation

The samples were prepared by adding approximately 130 mg of sample to "3.25 g of 50/50, by weight, tetrachlore-thane-d2/perchloroethylene" with 0.001 M Cr(AcAc)$_3$, in a NORELL 1001-7, 10 mm NMR tube. The samples were purged by bubbling N2 through the solvent, via a pipette inserted into the tube, for approximately five minutes, to prevent oxidation. Each tube was capped, sealed with TEF-LON tape, and then soaked at room temperature, overnight, to facilitate sample dissolution. The samples were kept in a N2 purge box, during storage, before, and after, preparation, to minimize exposure to 02. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensi-tivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—1H NMR Calculations

The signal from residual 1H in TCE (Tetrachloroethane)-d2 (at 6.0 ppm) was integrated, and set to a value of 100, and the integral from 3 to −0.5 ppm was used as the signal from the whole polymer in the control experiment. For the pre-saturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14).

The unsaturated group integrals, divided by the corre-sponding number of protons contributing to that integral, represent the moles of each type of unsaturation per X thousand carbons. Dividing the moles of each type of unsaturation by X, then gives the moles of unsaturated groups per 1000 moles of carbons.

Hexane Extractables

Polymer pellets (from the polymerization, pelletization process without further modification) were pressed in a Carver Press, at a thickness of 3.0-4.0 mils (approximately 2.2 grams of pellets pressed into a film). The pellets were pressed at 190° C., for three minutes, at 3,000 lb$_f$, and then at 190° C., for three minutes, at 40,000 lb$_f$. Non-residue gloves (PIP* CleanTeam* Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen, and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated. The [(amount of mass loss/initial weight of film)×100]=the weight percent of hexane extractable.

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A "25 mm disk" was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis
scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation Y=C1+C2 ln(x). Using the Orchestrator software, G' at G" equal to 500 Pa was determined by interpolation. In some cases, the G' (at a G" of 500 Pa) was determined from test temperatures of 150° C. and 190° C. The value at 170° C. was calculated from a linear interpolation from the values at these two temperatures.

Vicat Softening Point

Vicat softening point is measured according to ASTM D1525.

Infrared Spectroscopy (IR)

Comonomer levels, such as the vinyl acetate level, may be determined by ASTM E168.

Differential Scanning Calorimetry (DSC)

Differential Scanning Calorimetry (DSC) can be used to measure the melting and crystallization behavior of a polymer over a wide range of temperatures. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 lb$_f$ and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 14). The heat of fusion and the peak melting temperature are reported from the second heat curve. The peak crystallization temperature is determined from the cooling curve.

Experimental

Polymerization Simulations

A polymerization simulation model with applied reaction scheme and kinetics is described by Goto et al. (see below). Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses, predicted by these model frameworks, are determined by the reactor parameters and the applied reaction scheme and kinetic parameters. The applied reaction scheme and kinetic parameters are described below. The polymerization simulations were achieved with the Goto LDPE simulation model as described in the following: S. Goto et al.; *Journal of Applied Polymer Science: Applied Polymer Symposium*, 36, 21-40, 1981 (Title: *Computer model for commercial high pressure polyethylene reactor based on elementary reaction rates obtained experimentally*).

The kinetic data used by "Goto et al." was derived from high pressure free radical polyethylene polymerization experiments, performed at varying temperature, pressure and polymer concentration as described in the following: K Yamamoto, M. Sugimoto; *Rate constant for long chain-chain branch formation in free-radical polymerization of ethylene*; *J. Macromol. Science-Chem*., A13 (8), pp. 1067-1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 1 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as analyzed by the $^{13}$C NMR technique) in high pressure polyethylene, as a function of pressure and temperature conditions.

TABLE 1

Kinetic Constants for Main Reactions

| Units | Reaction | | |
|---|---|---|---|
| | ko [m³/(hr*kmol)] | Ea cal/mol | ΔV cc/mol |
| Propagation | 5.63E+11 | 10,520 | −19.7 |
| Termination | 3.0E+11 | 3,000 | 13.0 |
| Backbiting | 2.6E+12 | 12,130 | −14.0 |
| Transfer to Polymer | 1.75E+12 | 14,080 | 4.4 |
| Beta Elimination of Secondary Radical | 5.82E+11 | 15,760 | −22.6 |
| Beta Elimination of Tertiary Radical | 8.51E+10 | 14,530 | −19.7 |

The kinetic data for selected CTAs is given in Table 2. The kinetic constants were calculated with the kinetic constants of the Cs-value (ks/kp), as determined by Mortimer (see references after Table 3), and the ethylene propagation kinetics as given by Goto et al. (see Table 1 above).

TABLE 2

Kinetic Constants for Selected CTAs

| Component | Chain Transfer to Modifier | | | Reactivity Ratios | |
|---|---|---|---|---|---|
| | ko[m³/ (hr*kmol)] | Ea cal/mol | ΔV cc/mol | $r_1$ ($k_{11}$/ $k_{12}$) | $r_2$ ($k_{22}$/ $k_{21}$) |
| Propylene (CTA) | 2.20E+11 | 13,220 | −16.7 | 3.10 | 0.77 |
| Propionaldehyde (CTA) | 1.07E+11 | 9,720 | −8.4 | 0.00 | 0.00 |

[[r1 = $k_{11}/k_{12}$]]

TABLE 3

Reactivity ratios for selected comonomers

| comonomer | Reactivity Ratios | | Molecular weight g/mol | Boiling point ° C. |
|---|---|---|---|---|
| | $r_1$ ($k_{11}$/ $k_{12}$) | $r_2$ ($k_{22}$/ $k_{21}$) | | |
| Butyl vinyl ether | 4 | 0.06 | 100.16 | 94 |
| Octene-1* | 3.1 | | | 121 |
| Vinyl acetate | 1 | 0.9 | 86.09 | 71-73 |
| Vinyltrimethoxysilane | 1 | 0.9 | 148.23 | 123 |
| Vinyltrimethylsilane | 0.8 | 0.9 | 100.23 | 55 |
| Vinyl chloride | 0.5 | 1.0 | 62.5 | −13.4 |
| Vinyl butyrate | 0.5 | 0.9 | 114.14 | 115-117 |
| Allyl alcohol | 0.4 | 1 | 58.08 | 96-98 |
| Vinyl fluoride | 1.0 | 0.04 | 46.04 | −72 |

The comonomer reactivity r1 for octane-1 is described L. Boghetti, G. Mortimer and G. Daues, Journal of Polymer Science, *Free-radical copolymerization of α-olefins with ethylene*, Vol. 61, p 3-8 (1962); The reactivity ratios of the other example comonomers mentioned in Table 3 can be found in see P. Ehrlich, G. A. Mortimer, *Fundamentals of the free radical polymerization of ethylene*, Adv. Polymer Sci., Vol. 7, 386-448 (1970) and were derived through method 6. Method 6 derives values through computation using the Q-e scheme using the ethylene values of Burckhart and Zutty and Young's tabulated values for the other monomers. References can be found in above Ehrlich/Mortimer article. The kinetic $r_1$ and $r_2$ reactivity ratios are linked to the ethylene propagation kinetics for their temperature (Ea) and pressure (ΔV) dependencies. No further dependence in temperature and/or pressure behavior was assumed in this study and followed calculation methodologies.

The bifunctional comonomers having a carbon-carbon double bond A and a carbon-carbon double bond B, or have a carbon-carbon double bond and a group that can act as a CTA. Furthermore, multifunctional comonomers having multiple monomeric and/or CTA functional groups can be used. Useful CTA functional groups can be found in the Mortimer references below. The bi-functional and multifunctional comonomers, discussed above, modify the rheology of the polymer and are known as rheology modifying agents. The rheology modifying and/or crosslinking agents can be described, and modeled, through assigning kinetic $r_1$ and $r_2$ reactivity ratios (see Tables 3 below). The simulations examples do not show the use of the rheology modifying agents, however the rheology modifying and/or crosslinking agents can be used in combination with the simulated and/or claimed process conditions, in order to further to enhance the rheological properties like melt strength and G' needed for instance in extrusion application. The use of a crosslinking agent can be very helpful in wire cable application, for instance to prevent sagging of the plastic cable around the wire during the fabrication step. These branching agents have reactivities in the range of $r_1$ from 0.3 to 4.

TABLE 4

Reactivity Ratios for hypothetical hydrocarbon diene

| comonomer | | Reactivity Ratios | | Molecular weight g/mol | Boiling point ° C. |
|---|---|---|---|---|---|
| | | $r_1$ ($k_{11}$/ $k_{12}$) | $r_2$ ($k_{22}$/ $k_{21}$) | | |
| Di-allyl ether | Allyl (A) ether | 0.4 | 2.5 | 98.14 | 94-95 |
| | Allyl (B) ether | 0.4 | 2.5 | | |
| 1-7 Octadiene | Bond A | 3 | 0.8 | 110.2 | 114-121 |
| | Bond B | 3 | 0.8 | | |

Comonomer reactivity scheme data ($r_1$) are described in the following: L. Boghetti, G. Mortimer and G. Daues, Journal of Polymer Science, *Free-radical copolymerization of a-olefins with ethylene*, Vol. 61, p 3-8 (1962); G. Mortimer, Polymer Letters, *Free radical copolymerization of ethylene*, Vol. 3, p 343-344 (1965); P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972).

Description of Flow Diagram

FIG. 1 shows a generalized flow scheme of a simulated high pressure polymerization configuration containing a tubular reactor. Stream (1) is the ethylene make-up, which is compressed together with the outlet of the Booster by the Primary to stream (2). Stream (18) is the high pressure recycle stream containing unconverted ethylene, comonomer(s), chain transfer agent(s), etc., coming from stream (17). Stream (2) and Stream (18) are fed the "Secondary compressor and Reactor system" block. After finishing the reaction, and having applied cooling, the reaction mixture, containing produced polymer, unconverted ethylene, comonomer(s) and chain transfer agent(s) and other components, is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene-based stream (15) is cooled and cleaned in stream (17). Stream (16) is a purge stream to remove impurities and/or inerts. The polymer separated in the LPS is further processed in (12). The ethylene and other components removed in the LPS (13) is fed to the Booster, where, during the compression, condensables, such as solvent, comonomer(s), lubrication oil and others, are collected and removed through stream (14). The outlet of the Booster is combined with make-up ethylene stream (1), and further compressed by the Primary to form stream (2). The "the comonomer content (molar %) of the polymer fraction formed at the peak temperature in the last reaction zone" is determined using the kinetics (see Tables 1-4) and process conditions at the peak temperature in the last reaction zone. The comonomer molar concentration in the polymer fraction made at the highest temperature, in the last reaction zone, is given in Table 9 as comonomer molar concentration in the "Last peak temp Polymer" The comonomer molar concentration in the first polymer made in reaction zone 1 is given in Table 9 as comonomer molar concentration in the "Start Polymer" The comonomer content (molar %) of the total polymer produced is determined using the kinetics (see Tables 1-4) and process conditions along the reactor configuration, and is equal to the comonomer content of the polymer leaving the reactor configuration, and can be calculated as the cumulative molar concentration average (based on the weight of the polymer fractions) of the comonomer content in all polymer fractions produced along the reactor configuration. The comonomer molar conc. in the polymer leaving the reactor configuration is given in Table 9 as comonomer molar conc. in the "Whole polymer"

The molar comonomer content of the first 50 wt % polymer (based on the total amount of polymer produced) produced in the reactor configuration is determined using the kinetics (see Tables 1-4), and process conditions along the sections of the reactor configuration, used to produce the first 50 wt % of the total polymer, and can be calculated as the cumulative molar concentration average in the polymer weight fractions that make-up the first 50 wt % of the total polymer produced in the reactor configuration. When only cumulative data is available just above, and just below, the first "50 wt %" data point, the comonomer amount in the first 50 wt % of the total polymer is determined by a linear interpolation between these two data points. The molar comonomer content of the last 50 wt % polymer (based on the total amount of polymer produced) produced in the reactor configuration ($C_{last}$) is determined by from "the molar concentration the comonomer content of the first 50 wt % polymer=$C_{first}$" and the "molar comonomer content of the total polymer produced=$C_{total}$" as follows:

$$C_{last}=[(2\times C_{total})-C_{first}].$$

Figure 2:
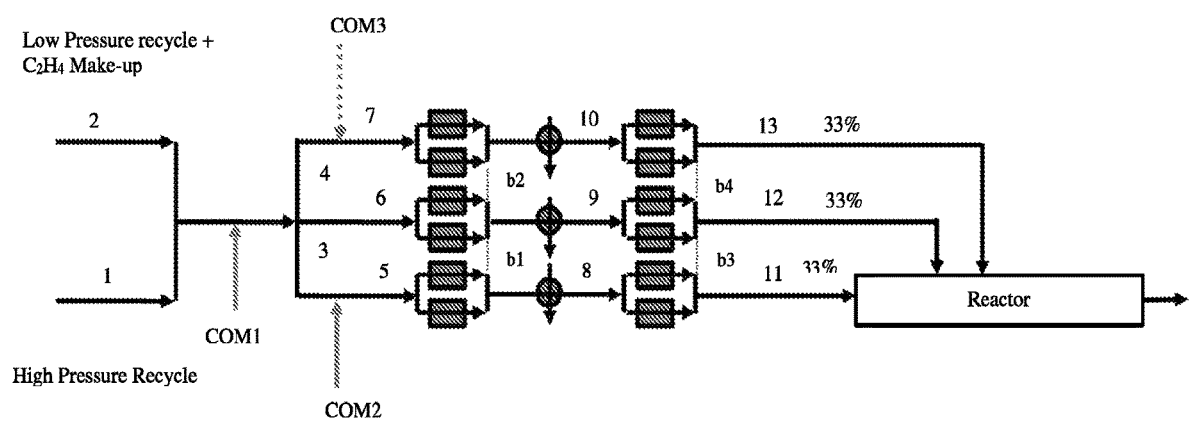
FIG. 2 depicts a comparative Process Flow Diagram of comonomer distribution for 33/33/33/0 reactor configuration.

FIG. 2 (CP1-CP13) Comparative Process Flow Diagram of comonomer distribution for 33/33/33/0 reactor configuration. FIG. 2 shows the flow scheme for three ethylene-based feed streams with a 33/33/33/0 distribution over the reaction zones. The ethylene based feed distribution is a molar feed distribution. The notation 33/33/33/0 means that each of the first three reaction zones receives ⅓ of the total molar ethylene-based feed stream, while the fourth reaction zone does not receive an ethylene based feed stream The Hyper compressor system has a total of twelve cylinders in the first and second compression stages. The HPR flow with high level of unconverted comonomer (line 1) is mixed with the LPR and the ethylene make-up, and has a low level of unconverted comonomer, and is to be distributed over line 5, line 6 and line 7, through line 3 and line 4. Line 5, line 6 and line 7 have equal molar flow and composition. This equal molar flow and composition are maintained in the intermediate lines 8, 9 and 10, and maintained up to the reactor through line 11, 12 and 13. The intermediate or interstage lines are equipped with so-called interstage coolers, in order to cool down the ethylene-based flows after the first compression, and before heating these flows by the second compression stage. Optionally the secondary compressors discharge lines might be equipped with balancing lines b1, b2, b3 and b4. These balance lines will not affect the composition in lines 8-10 and lines 11-13 due to the equal compositions in these lines. Furthermore, the flow movements through these lines are limited by the pulse wise and the "to and fro" flow movements, the reduced diameter of, and/or the presence of, restricted orifices in these balance lines. In the shown flow scheme, the suction, intermediate flow, the discharge hyper flow and the reactor ethylene-based feed flows are split into the following molar ratios: ⅓, ⅓ and ⅓ of the total molar ethylene-based feed flow to the hyper compressor and the reactor. Stream 11 is sent to the front reactor, where after preheating to the desired start temperature, it enters the first reaction zone. Initiator is injected at the start of the first reaction zone. Stream 12 and stream 13, are after optionally cooling, sent, respectively, to the inlet of the second and third reaction zones. Each sequential reaction zones receives the outlet of the previous reaction zone and optionally an additional ethylene based feed flow and/or optionally a comonomer feed and/or CTA feed. At start of each reaction zone, an initiator system is injected, or fed indirectly by injection of initiator in optional ethylene based, comonomer and/or chain transfer agent feed, at the beginning of the reaction zone. Make-up comonomer can be fed through line COM1, COM2 and/or COM3. Optionally comonomer can be fed into each feed stream to a reaction zone and/or directly into a reaction zone. Make-up CTA can, in principle, be fed into, and/or distributed over, the streams 1, 2, 3, 4, 5, 6, 7, 8, 9, 10, 11, 12 or 13. The CTA system can consist of single and/or multiple components, and can include varying compositions.

Figure 3:
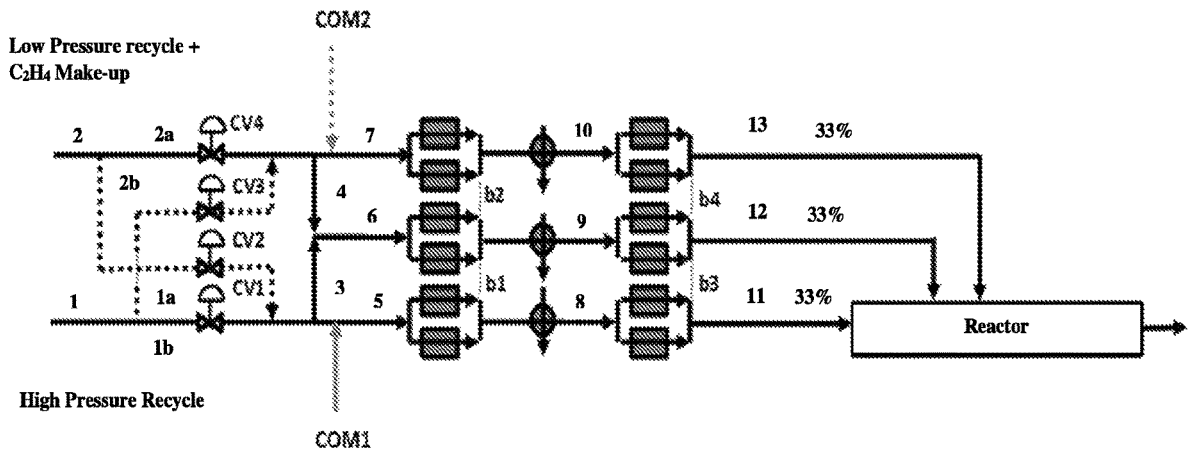
FIG. 3 depicts an inventive Process Flow Diagram of flexible control of make-up ethylene and comonomer distribution for 33/33/33/0 reactor configuration.
Figure 4:
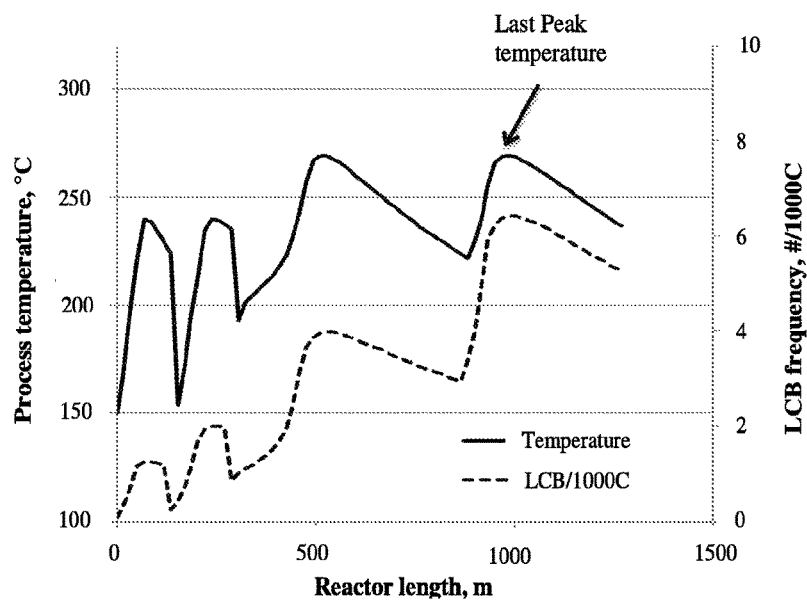
FIG. 4 depicts the process temperature and LCB frequency vs reactor length for IP1.
Figure 5:
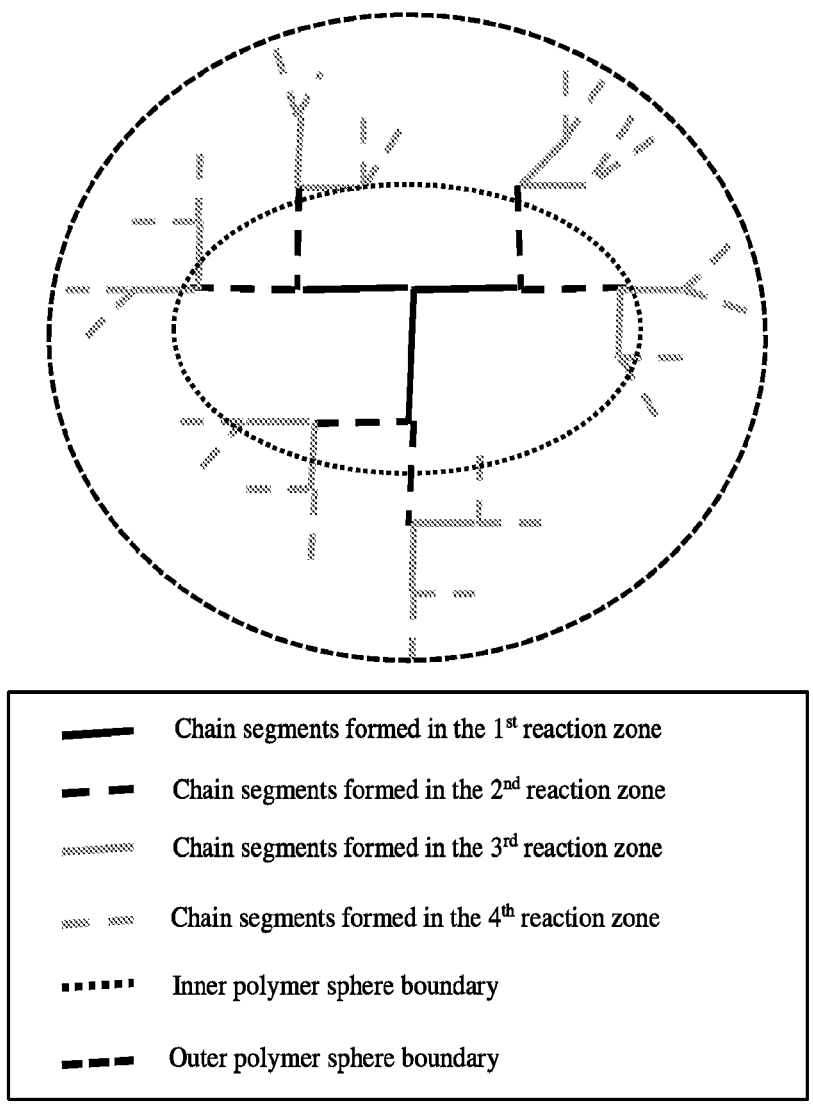
FIG. 5 is a schematic of the final structure of larger polymer molecules, which are formed by adding long chain branches to a starting polymer backbone.
Figure 6:
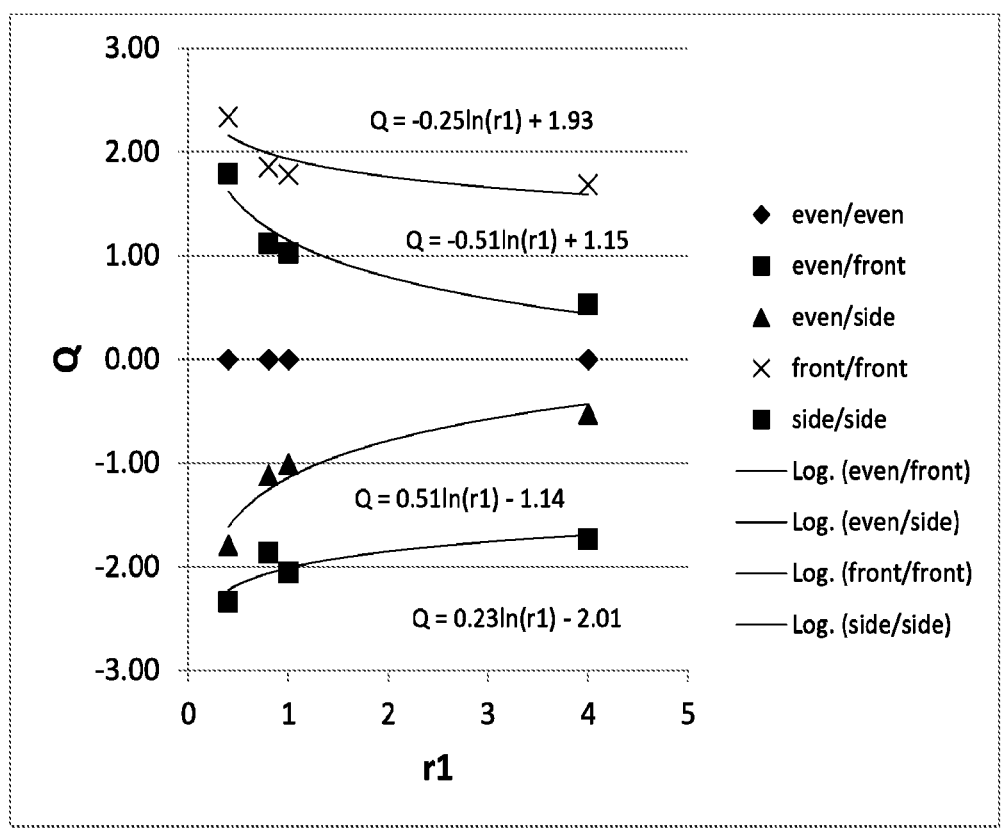
FIG. 6 depicts the distribution for different comonomers (Q vs. r1).

FIG. 3 (IP1-IP10) Inventive Process Flow Diagram of flexible control of make-up ethylene and comonomer distribution for 33/33/33/0 ethylene-based feed configuration. The Hyper compressor system has a total of twelve cylinders in the first and second compression stages. The HPR (High Pressure Recycle) stream 1, with high level of unconverted comonomer (line 1), is kept separated from stream 2 containing the Low Pressure Recycle and ethylene make-up. Stream 2 has a low level of unconverted comonomer. CV1, CV2, CV3 and CV4 are control valves. The notations 1a, 1b, 2a and 2b are lines to change/control the distribution of stream 1 and stream 2 over the suction streams 5, 6 and 7 of the hyper compressor. The following control scenarios of distributing streams 1 and 2 over the hyper suction streams 5, 6 and 7 are possible:

A. When CV2 and CV3 are closed, stream 5 will receive an ethylene-based flow from line 1b, and stream 7 will receive an ethylene-based flow from line 2a. Stream 6 will receive ethylene-based flows from line 3 and/or line 4.
B. When CV1 and CV4 are closed, stream 5 will receive an ethylene-based flow from line 2b, and stream 7 will receive an ethylene-based flow from line 1a. Stream 6 will receive ethylene-based flows from line 3 and/or line 4.
C. When the position of CV1, CV2, CV3 and CV4 are each adjusted to open, shut, or partially open positions, stream 1 and stream 2 can be freely distributed by means of lines 1a, 1b, 2a and 2b, over stream 5 and stream 7, while stream 6 will receive ethylene-based flows from line 3 and/or line 4.

In all above cases, balancing of feed streams 5, 6 and 7 can occur through lines 3 and 4. Stream 5, stream 6 and stream 7 have equal molar flow (equal molar flow=equal volumetric rate (m³ per hr) as set by the volumetric capacities from the plunger/cylinder arrangement of the hyper compressor system), but adjustable compositions, depending on the applied control schemes mentioned above (A-C). This equal molar flow, set by the compressor configuration, and the compositions, are maintained in the intermediate lines 10, 9, and 8, and up to the reactor through line 13, 12 and 11 corresponding to the compositions established in line 7, line 6 and line 5, respectively. The intermediate or interstage lines are equipped with so-called interstage coolers, in order to cool down the ethylene-based flows after the first compression, before heating by the second compression stage. Optionally, the secondary compressors discharge lines might be equipped with balancing lines b1, b2, b3 and b4. These balance lines will have limited effect on the compositions in lines 8, 9 and 10 and lines 11, 12 and 13, due to the limited flow movements through these lines, by the pulse wise and the "to and fro" flow movements, the reduced diameter of, and/or presence of, restricted orifices in these balance lines. In the shown flow scheme, the suction flow, intermediate flow and discharge hyper flow and the ethylene-based feed flows to the reactor are split into the following molar ratios: in ⅓, ⅓ and ⅓ of the total molar feed flow from the hyper compressor and to the reactor. Stream 11 is sent to the front of the reactor, where after preheating to the desired start temperature, it enters the first reaction zone. Initiator is injected at the start of the first reaction zone. Stream 12 and stream 13 are, after optional cooling, sent, respectively, to the inlet of the second and third reaction zones. Each sequential reaction zones receives the outlet of the previous reaction zone, and optionally an additional ethylene based feed flow and/or optionally a comonomer feed and/or CTA feed. At start of each reaction zone, an initiator system is injected, or fed indirectly by injection of initiator in optional ethylene based, comonomer and/or chain transfer agent flow fed at the beginning of the reaction zone. Make-up comonomer can be fed through line COM1 and/or COM2. Optionally, comonomer can be fed into each feed stream to a reaction zone and/or directly into a reaction zone. Make-up CTA can, in principle, be fed in, and/or distributed over, the streams 1, 2, 3, 4, 5, 6, 7, 8, 9, 10, 11, 12 or 13. The CTA system can consist of single and/or multiple components, and can include varying compositions.

Simulation Approach for Comonomer Distribution Study:

The ethylene/comonomer simulation study has been carried out with the following systematic approach: Step 1: Determination of relationship between ethylene and comonomer conversion levels as function of reactivity ratio $r_1$, polymer conversion level and level of comonomer incorporation in polymer. Step 2: Calculation of comonomer distribution in ethylene based feeds to the reactor system, using even and extreme distribution cases for comonomer feed, HPR flow, Primary compressor output flow, each flow over the ethylene based feed streams to the reactor. Step 3: Calculation of comonomer distribution in produced copolymer using even and extreme distribution cases for comonomer feed, HPR flow, Primary compressor output flow, each flow over the ethylene based feed streams to the reactor. Simulations have been carried out using the following comonomers: n-butylvinylether, vinylacetate, vinyltrimethoxysilane, vinyltrimethylsilane and allylalcohol; however, for this study, the inventive distribution of comonomer in the reactor and resulting copolymer is not restricted to these comonomers, but comprises all vinyl containing comonomers with similar $r_1$ reactivities.

The achievable distributions on incorporated comonomer and associated functionality, in the produced copolymer, will affect the functionality, basic product properties and application properties of the copolymer. The intermolecular and/or intramolecular distributions of the incorporated comonomer in the copolymer have for a few copolymers, like ethylene vinylacetate (EVA) and ethylene vinyltrimethoxysilane (EVTMOS), been translated for a certain level of comonomer to, respectively, the excellent crystallinity and melting behavior and/or ranges and Vicat softening point behavior for EVA copolymers and improved and more efficient crosslinkability for EVTMOS copolymers.

Determination of Relationship Between Ethylene and Comonomer Conversion Levels:

Table 5 shows the comonomer conversion as function of comonomer level in the copolymer, polymer conversion level and reactivity ratio r1.

TABLE 5

| Comonomer level in polymer in wt % | Polymer conversion in wt % | Reactivity ratio r1 | | | |
| --- | --- | --- | --- | --- | --- |
| | | 4 | 1 | 0.7 | 0.4 |
| | | Comonomer conversion level in wt % | | | |
| 2 | 30 | 9.13 | 30.3 | 40 | 58.6 |
| 5 | 30 | 9.87 | 30.5 | 40 | 58.5 |
| 15 | 30 | 12.2 | 31.2 | 40.2 | 58.2 |
| 15 | 25 | | 25.9 | | |
| 15 | 35 | | 36.3 | | |

The following relationship has been derived for comonomer conversion level as function of polymer conversion and r1 value, by using the data in Table 5: Comonomer conversion (wt %)=(Polymer conversion/30)*(30*(r1)−(−0.779)) EQN. A.

The following relationship has been derived for ethylene conversion level as function of polymer conversion and r1 value, by using the data in Table 6: Ethylene conversion (wt %)=(polymer conversion/30.0)*[(0.24868*Comonomer content−0.036)*r1−0.2585*Comonomer content+30.1)] EQN. B.

TABLE 6

Ethylene conversion as function of comonomer level in polymer, polymer conversion level and reactivity ratio r1

| | | Comonomer content in polymer | | |
|---|---|---|---|---|
| reactivity ratio r1 = k11/k12 | Polymer conversion in wt % | 2 wt % | 5 wt % | 15 wt % |
| | | Ethylene conversion in wt % | | |
| 4 | 30 | 31.45 | 33.6 | 40.5 |
| 1 | 30 | 30 | 29.9 | 29.9 |
| 0.7 | 30 | 29.9 | 29.6 | 28.8 |
| 0.4 | 30 | 29.8 | 29.3 | 27.7 |
| 1 | 25 | | | 24.9 |
| 1 | 35 | | | 33.6 |

Equations A and B have been used to calculate the comonomer feed concentration for the simulations performed for 33/33/33/0 ethylene based feed distribution.

Calculation of Comonomer Distribution in Ethylene Based Feeds to the Reactor

Table 7 shows an example calculation of the comonomer concentrations in the ethylene based feeds as function of the distribution of the Primary compressor output and/or make-up comonomer, each over the ethylene based streams to the reactor. The calculation was carried out for r1 value of 1 and an ethylene conversion level of 30 wt %. Even and extreme distribution cases for comonomer feed, HPR flow, Primary compressor output flow are demonstrated in the calculation examples. The derived Component distribution factors FRX1, FRX2 and FRX3 were used in the simulations to specify the comonomer distribution over the ethylene-based feed distribution. In case of a terpolymer this calculation/analysis has to be performed for each relevant comonomer. Although, typically the calculation for n-butylvinylether, vinylacetate, vinyltrimethoxysilane (VTMOS), vinyltrimethylsilane (VTMS) and allylalcohol, except VTMOS, assumes a condensation level of 50 wt % in the Booster compressor, and a condensation level of 100 wt % for VTMOS, due to its higher bp, for the general calculation scheme demonstrated in Table 7, a condensation level of 0 wt % was used.

Detail of Tubular Reactor Simulations

The simulations have carried out for a four reaction zone configuration with an ethylene based molar flow feed configuration of "⅓-⅓-⅓-0" (or alternative notation "33/33/33/0"), meaning that ⅓ of the total ethylene-based feed flow was sent to each of reaction zone 1, 2 and 3, while the fourth reaction zone did not receive an ethylene-based feed flow. The reactor zones have the following distributions of internal diameters and length, namely: internal diameter 31/45/54/54 mm; length 136/153/646/340 m. The total ethylene-based throughput was 60,000 kg per hr, based on an ethylene homopolymer operation.

In case of copolymerization, the throughput, in number of moles, remains the same, while the total and individual ethylene-based feed flows, in mass, will go up by the partial replacement of ethylene by comonomer components. The net impact in mass is a function of type and level of comonomer. Initiator systems, comprising a mixture of multiple or single initiators, are injected into the reactor at different locations, to create multiple reaction zones, and thus creating a four peak temperature profile, and elevating the conversion to polymer. The half-life temperature of each peroxide is listed in Table 3. Typically mixtures of Tert-butyl peroxy-2-ethylhexanoate (TBPO) and Di-tert-butyl peroxide (DTBP) have been used; however with low start and/or reinitiation temperatures, Tert-butyl peroxypivalate (TBPIV) can be added. In case of lower peak temperature, 270 Deg C. or lower, DTBP was replaced by Tert-butyl peracetate (TBPA).

The pressurized water temperatures, for cooling or heating the reaction zones, are operated with an inlet temperature of 155° C., with the exemption of reaction zone 1 (including the preheating zone), which is operated at 190° C. All zones were simulated with a counter current cooling/heating configuration. Alternatively, the pressurized water temperatures can be operated at other uniform or non-uniform settings. The cooling zones can be operated in a co- and/or counter-current mode. The simulations have been done with an inlet temperature of the first reaction zone of 150° C. Table 8 shows the process conditions used to simulate the copolymerization of ethylene with, respectively, n-butylvinylether, vinylacetate, vinyltrimethoxysilane, vinyltrimethylsilane and allylalcohol. All copolymerization were carried out at even and extreme distribution cases for comonomer feed, HPR flow, and Primary compressor output flow.

Figure 7:
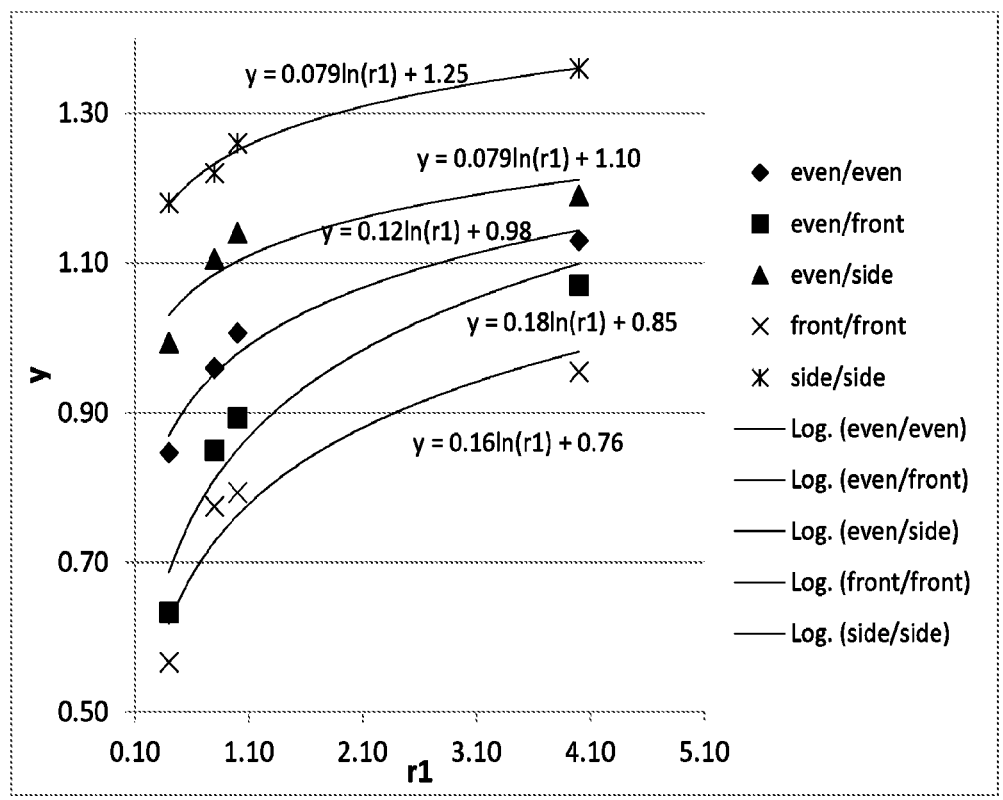
FIG. 7 depicts the "y versus r1" profiles for several comonomers.
Figure 8:
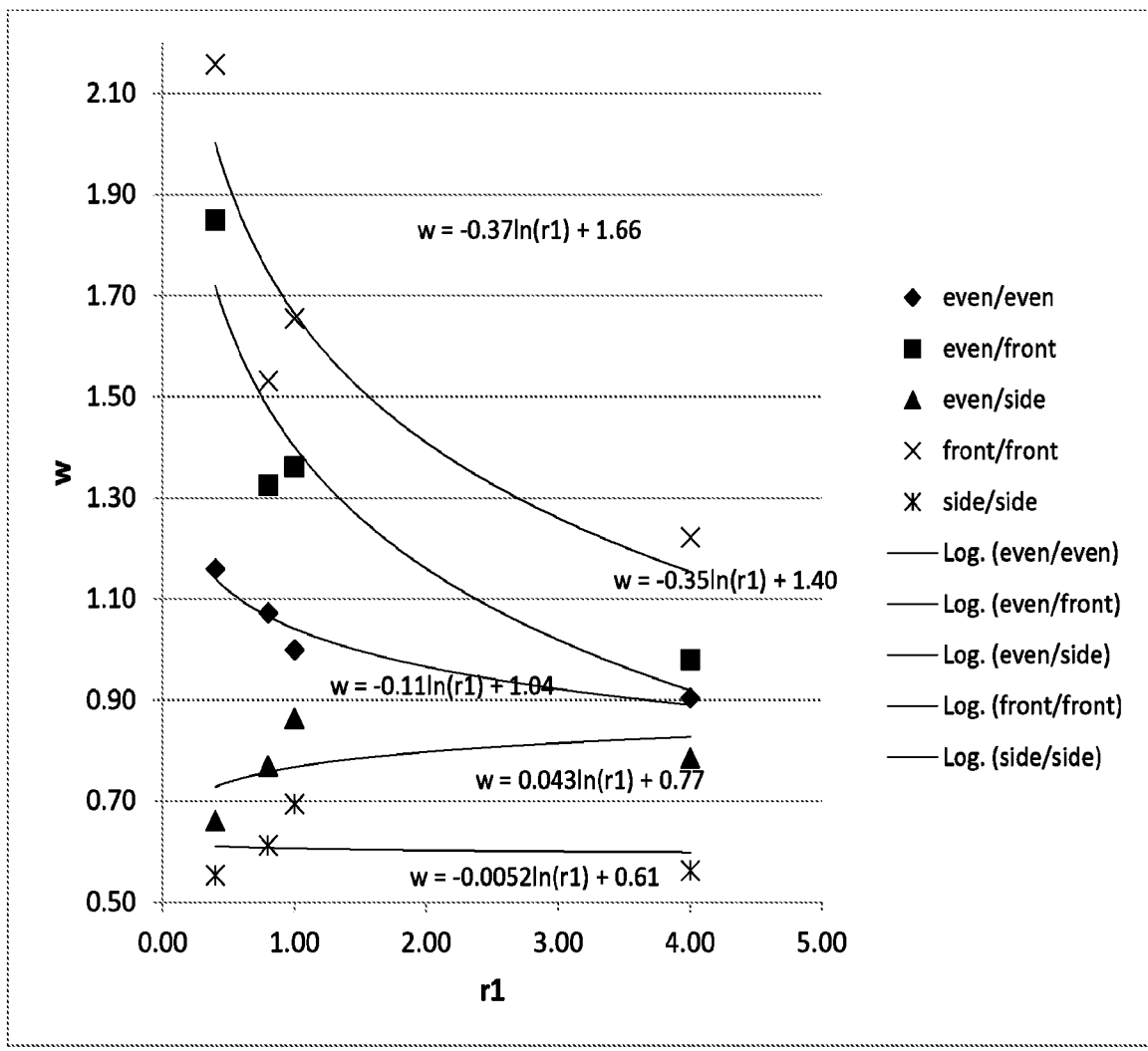
FIG. 8 depicts the "w versus r1" profiles for several comonomers

Table 9 shows the derived data on the following features: comonomer content in polymer, comonomer conversion level, ratio of comonomer concentration in first ethylene based feed, minus the conc. in the average feed to the reactor, divided by the conc. in the average feed to the reactor ((Feed1−Average)/Average), composition of first polymer made in the reactor, composition of polymer made at the peak temperature in the last reaction zone (this resembles the n-hexane extraction fraction), composition of the first 50 wt % of copolymer made, composition the last 50 wt % of copolymer made, the ratio of the composition of the first 50 wt % copolymer versus the composition of the last 50 wt % copolymer, and the ratio of the copolymer composition made at the peak temperature in the last reaction zone versus the composition of the whole polymer made in the reactor. The comonomer concentration in the average feed is the concentration of comonomer in the sum of all ethylene-based feeds to the reactor. The "composition of copolymer" refers to the level of comonomer, in molar %, in the copolymer. The composition data on "starting polymer versus whole copolymer" shows that the inventive distributions of Primary output, HPR and comonomer make-up can result in block type of copolymer, even when low reactive comonomer are used. Furthermore, the inventive ratio in composition of the first 50 wt % polymer versus last 50 wt % polymer indicates that copolymers with unique basic product properties, as well as application properties, can be made. For instance, the inventive contribution of commoner level in the copolymer can lead to unique combinations of polymer properties, in regard to, for example, melting/crystallization behavior, adhesion and crosslinking properties. Furthermore, a larger concentration of comonomer functionality in the outer sphere of larger polymer molecules, instead of buried and shielded within the inner sphere of such large molecules, can potentially lead to a desired copolymer functionality at an overall lower level of comonomer, required for instance, wire and cable applications, or to improved copolymer functionality at a similar overall level of comonomer. The arguments for these last advantages are depicted in FIG. 7, showing when the last 50 wt % of the polymer has a higher level of the comonomer, the associated functionality will be favorable situated in the outer sphere of the larger molecules. Furthermore, the smaller molecules will have a higher level comonomer, thus contributing to properties, such as adhesion, without negatively affecting the overall melting point of the whole polymer. Properties of commercially available ethylene vinylacetates copolymers are shown in Table 11.

TABLE 7

General calculation scheme of the comonomer concentrations in the ethylene based feeds as function of the distribution of the make-up ethylene and/or make-up comonomer over the ethylene based streams to the reactor. Calculations were performed for 0 wt % condensation for the LPR.

| Process | Ethylene based feed distribution: 33/33/33/0*, # of plungers: 12 | | | | | | | | | |
|---|---|---|---|---|---|---|---|---|---|---|
| Process polymer conversion | 30% | | | | | | | | | |
| HPR distribution | Even | | Even | | Even | | Front | | Back | |
| Make-up Comonomer distribution | Even | | Front | | Back | | Front | | Back | |
| Make-up CTA location | CTA1 | | CTA1 | | CTA3 | | CTA1 | | CTA3 | |
| Example | CP1 | | CP2 | | CP3 | | IP1 | | IP2 | |
| Flow distribution | C2= | Comon. | C2= | Comon. | C2= | Comon. | C2= | Comon. | C2= | Comon. |
| r1 |  | 1 |  | 1 |  | 1 |  | 1 |  | 1 |
| Conversion | 30% | 30.0% | 30% | 30.0% | 30% | 30.0% | 30% | 30.0% | 30% | 30.0% |
| Purge | 2% | 2.0% | 2% | 2.0% | 2% | 2.0% | 2% | 2.0% | 2% | 2.0% |
| Make-up flow feed | 32% | 32.0% | 32% | 32.0% | 32% | 32.0% | 32% | 32.0% | 32% | 32.0% |
| Total recycle + purge | 70% | 70.0% | 100% | 70.0% | 100% | 70.0% | 100% | 70.0% | 100% | 70.0% |
| Total recycle | 68% | 68.0% | 68% | 68.0% | 68% | 68.0% | 68% | 68.0% | 68% | 68.0% |
| Entrainment component in polymer | 22% |  | 22% |  | 22% |  | 22% |  | 22% |  |
| Unconverted component to LPR | 6.6% | 6.6% | 6.6% | 6.6% | 6.6% | 6.6% | 6.6% | 6.6% | 6.6% | 6.6% |
| condensation in LPR |  | 0.0% |  | 0.0% |  | 0.0% |  | 0.0% |  | 0.0% |
| Unconverted component to HPR | 61.4% | 61.4% | 61.4% | 61.4% | 61.4% | 61.4% | 61.4% | 61.4% | 61.4% | 61.4% |
| Stream 1 | 61.4% | 61.4% | 61.4% | 61.4% | 61.4% | 61.4% | 61.4% | 61.4% | 38.6% | 6.6% |
| Stream 2 | 38.6% | 6.6% | 38.6% | 6.6% | 38.6% | 6.6% | 38.6% | 6.6% | 61.4% | 61.4% |
| Stream 3 | 16.7% |  | 16.7% |  | 16.7% |  | 28.1% | 28.1% | 5.3% | 0.9% |
| Stream 4 | 16.7% |  | 16.7% |  | 16.7% |  | 5.3% | 0.9% | 28.1% | 28.1% |
| Stream 5 | 33.3% | 33.3% | 33.3% | 55% | 33.3% | 23% | 33.3% | 65.3% | 33.3% | 5.7% |
| Stream 6 | 33.3% | 33.3% | 33.3% | 23% | 33.3% | 23% | 33.3% | 29.0% | 33.3% | 29.0% |
| Stream 7 | 33.3% | 33.3% | 33.3% | 23% | 33.3% | 55% | 33.3% | 5.7% | 33.3% | 65.3% |
| Stream 11 | 33.3% | 33.3% | 33.3% | 54.7% | 33.3% | 22.7% | 33.3% | 65.3% | 33.3% | 5.7% |
| Stream 12 | 33.3% | 33.3% | 33.3% | 22.7% | 33.3% | 22.7% | 33.3% | 29.0% | 33.3% | 29.0% |
| Stream 13 | 33.3% | 33.3% | 33.3% | 22.7% | 33.3% | 54.7% | 33.3% | 5.7% | 33.3% | 65.3% |
| Component distribution FRX1 | 0.32 | 1.00 | 0.32 | 1.64 | 0.32 | 0.68 | 0.00 | 1.96 | 0.83 | 0.17 |
| Component distribution FRX1 | 0.32 | 1.00 | 0.32 | 0.68 | 0.32 | 0.68 | 0.13 | 0.869 | 0.13 | 0.869 |
| Component distribution FRX1 | 0.32 | 1.00 | 0.32 | 0.68 | 0.32 | 1.64 | 0.83 | 0.17 | 0 | 1.96 |

Note*:.

TABLE 8

| Example | Comonomer type | Peak temp's | Melt-index I2 | CTA | Inlet pressure bar | HPR | Comonomer make-up line-up | Feed 1 mol % | Feed 2 mol % | Feed 3 mol % | Ave. feed* mol % |
|---|---|---|---|---|---|---|---|---|---|---|---|
| CP1 | Vinyl acetate | 240/240/270/270 | 4 | Propylene | 2800 | even | even | 4.7 | 4.7 | 4.7 | 4.70 |
| CP2 | Vinyl acetate | 240/240/269/269 | 4 | Propylene | 2800 | even | front | 15 | 3 | 2.9 | 6.97 |
| CP3 | Vinyl acetate | 240/240/270/270 | 4 | Propylene | 2800 | even | side | 3.4 | 3.4 | 8.57 | 5.12 |
| IP1 | Vinyl acetate | 240/240/269/269 | 4 | Propylene | 2800 | front | front | 8.4 | 3.7 | 0.75 | 4.28 |
| IP2 | Vinyl acetate | 240/240/270/270 | 4 | Propylene | 2800 | side | side | 0.09 | 4.7 | 10.7 | 5.16 |
| CP4 | n-Butylvinylether | 240/240/273/273 | 4 | PA | 2800 | even | even | 0.95 | 0.95 | 0.95 | 0.95 |
| CP5 | n-Butylvinylether | 240/240/273/273 | 4 | PA | 2800 | even | front | 1.23 | 0.75 | 0.75 | 0.91 |
| CP6 | n-Butylvinylether | 240/240/273/273 | 4 | PA | 2800 | even | side | 0.82 | 0.82 | 1.34 | 0.99 |
| IP3 | n-Butylvinylether | 240/240/273/273 | 4 | PA | 2800 | front | front | 1.5 | 0.89 | 0.1 | 0.83 |
| IP4 | n-Butylvinylether | 240/240/273/273 | 4 | PA | 2800 | side | side | 0.1 | 1.2 | 2.02 | 1.11 |
| CP7 | VTMOS* | 240/240/287/287 | 2 | Propylene | 2800 | even | even | 0.37 | 0.37 | 0.37 | 0.37 |
| IP5 | VTMOS* | 240/240/287/287 | 2 | Propylene | 2800 | front | front | 0.69 | 0.275 | 0 | 0.32 |
| IP6 | VTMOS* | 240/240/287/287 | 2 | Propylene | 2800 | side | side | 0 | 0.375 | 0.96 | 0.45 |
| CP8 | Allyl alcohol | 240/240/267/267 | 2 | PA | 2800 | even | even | 3.73 | 3.73 | 3.73 | 3.73 |
| CP9 | Allyl alcohol | 240/240/267/267 | 2 | PA | 2800 | even | front | 7.53 | 1.39 | 1.39 | 3.44 |
| CP10 | Allyl alcohol | 240/240/267/267 | 2 | PA | 2800 | even | side | 1.73 | 1.73 | 9.4 | 4.29 |
| IP7 | Allyl alcohol | 240/240/268/268 | 2 | PA | 2800 | front | front | 7.96 | 1.86 | 0.17 | 3.33 |
| IP8 | Allyl alcohol | 240/240/268/268 | 2 | PA | 2800 | side | side | 0.23 | 2.5 | 10.64 | 4.46 |
| CP11 | VTMS** | 240/240/285/285 | 2 | PA | 2800 | even | even | 0.465 | 0.465 | 0.465 | 0.47 |
| CP12 | VTMS** | 240/240/285/285 | 2 | PA | 2800 | even | front | 0.755 | 0.27 | 0.27 | 0.43 |

TABLE 8-continued

| Example | Comonomer type | Peak temp's | Melt-index I2 | CTA | Inlet pressure bar | HPR | Comonomer make-up line-up | Comonomer molar conc. in ith feed | | | |
|---|---|---|---|---|---|---|---|---|---|---|---|
| | | | | | | | | Feed 1 mol % | Feed 2 mol % | Feed 3 mol % | Ave. feed* mol % |
| CP13 | VTMS** | 240/240/285/285 | 2 | PA | 2800 | even | side | 0.32 | 0.32 | 0.89 | 0.51 |
| IP9 | VTMS** | 240/240/285/285 | 2 | PA | 2800 | front | front | 0.835 | 0.33 | 0.07 | 0.41 |
| IP10 | VTMS** | 240/240/285/285 | 2 | PA | 2800 | side | side | 0.09 | 0.44 | 1.11 | 0.55 |

Polymer conversion is 30 wt % for examples (comparative and inventive).
*Ave. Feed is concentration (mol %) of comonomer in the sum of the of the ethylene-based feeds, based on total moles of components in the sum of the ethylene-based feeds.
Note,
for each mol % comonomer in an ethylene-based feed (for example, Feed 1), the concentration (mol %) of comonomer in this feed is based on total moles of components in this feed.

TABLE 9

| Ex. | Comonomer content in Polymer wt % | Comonomer conversion % | Ratio Com conc. (Feed1 − Average)/ Average | Comonomer molar conc. in polymer | | | | Comonomer conc. ratio | |
|---|---|---|---|---|---|---|---|---|---|
| | | | | Start Polymer wt % | Last peak temp polymer wt % | First 50% Polymer wt % | Last 50% Polymer wt % | Ratio First 50% vs Last 50% Polymer | Ratio Last Peak Temp. Polymer/Whole Polymer |
| CP1 | 15 | 31.2 | 0 | 14.5 | 15.1 | 15 | 15 | 1.00 | 1.00 |
| CP2 | 15 | 32.6 | 1.15 | 22.5 | 13.4 | 17.3 | 12.7 | 1.36 | 0.89 |
| CP3 | 15 | 28.9 | −0.34 | 10.7 | 17.1 | 13.9 | 16.1 | 0.86 | 1.14 |
| IP1 | 15 | 34.4 | 0.96 | 25.8 | 11.9 | 18.7 | 11.3 | 1.65 | 0.79 |
| IP2 | 15 | 27 | −0.98 | 2.9 | 18.9 | 12.3 | 17.7 | 0.69 | 1.26 |
| CP4 | 1 | 8.86 | 0.00 | 0.87 | 1.13 | 0.95 | 1.05 | 0.90 | 1.13 |
| CP5 | 1 | 9.24 | 0.35 | 1.12 | 1.07 | 0.99 | 1.01 | 0.98 | 1.07 |
| CP6 | 1 | 8.45 | −0.17 | 0.75 | 1.19 | 0.88 | 1.12 | 0.79 | 1.19 |
| IP3 | 1 | 10.1 | 0.81 | 1.39 | 0.955 | 1.1 | 0.9 | 1.22 | 0.96 |
| IP4 | 1 | 7.5 | −0.91 | 0.11 | 1.36 | 0.72 | 1.28 | 0.56 | 1.36 |
| CP7 | 2.4 | 30 | 0.00 | 2.47 | 2.29 | 2.4 | 2.4 | 1.00 | 1.00 |
| IP5 | 2.4 | 35.3 | 1.15 | 4.25 | 1.82 | 2.88 | 1.92 | 1.50 | 0.76 |
| IP6 | 2.4 | 25.4 | −1.00 | 0 | 3.01 | 1.73 | 3.07 | 0.56 | 1.25 |
| CP8 | 15 | 57.8 | 0.00 | 17.4 | 12.7 | 16.11 | 13.89 | 1.16 | 0.85 |
| CP9 | 15 | 62.2 | 1.19 | 32.1 | 9.5 | 19.47 | 10.53 | 1.85 | 0.63 |
| CP10 | 15 | 50.2 | −0.60 | 8.5 | 14.9 | 11.95 | 18.05 | 0.66 | 0.99 |
| IP7 | 15 | 64.4 | 1.39 | 33.7 | 8.5 | 20.5 | 9.5 | 2.16 | 0.57 |
| IP8 | 15 | 48.2 | −0.95 | 1.16 | 17.7 | 10.7 | 19.3 | 0.55 | 1.18 |
| CP11 | 2 | 36.1 | 0.00 | 2.07 | 1.92 | 2.07 | 1.93 | 1.07 | 0.96 |
| CP12 | 2 | 39 | 0.75 | 3.36 | 1.7 | 2.28 | 1.72 | 1.33 | 0.85 |
| CP13 | 2 | 33 | −0.37 | 1.4 | 2.21 | 1.74 | 2.26 | 0.77 | 1.11 |
| IP9 | 2 | 41 | 1.03 | 3.72 | 1.55 | 2.42 | 1.58 | 1.53 | 0.78 |
| IP10 | 2 | 30.9 | −0.84 | 0.33 | 2.44 | 1.52 | 2.48 | 0.61 | 1.22 |

Note:
Comonomer concentration last peak vs. whole polymer ratio can be measured by analyzing the comonomer content in the n-hexane extract vs. whole polymer

TABLE 10

| Ex. | Q | Q claim 1 upper boundary | Q claim 1 lower boundary | Q > Eqn 2 | Q < Eqn 3 | y ratio | y Cl. 10 upper bound | y Cl. 10 lower bound | y > Cl. 11 a | y < Cl. 11 b | Calculated w Ratio First vs Last 50% | w ratio upper bound Cl. 13 | w ratio lower bound Cl. 13 | w ratio lower bound Cl. 14 | w ratio lower bound Cl. 14 |
|---|---|---|---|---|---|---|---|---|---|---|---|---|---|---|---|
| CP1 | 0.00 | 2.15 | −2.16 | 1.15 | −1.14 | 1 | 1.27 | 0.72 | 1.10 | 0.85 | 1.00 | 1.82 | 0.57 | 1.53 | 0.70 |
| CP2 | 1.03 | 2.15 | −2.16 | 1.15 | −1.14 | 0.89 | 1.27 | 0.72 | 1.10 | 0.85 | 1.36 | 1.82 | 0.57 | 1.53 | 0.70 |
| CP3 | −1.01 | 2.15 | −2.16 | 1.15 | −1.14 | 1.14 | 1.27 | 0.72 | 1.10 | 0.85 | 0.86 | 1.82 | 0.57 | 1.53 | 0.70 |
| IP1 | 1.79 | 2.15 | −2.16 | 1.15 | −1.14 | 0.79 | 1.27 | 0.72 | 1.10 | 0.85 | 1.65 | 1.82 | 0.57 | 1.53 | 0.70 |
| IP2 | −2.05 | 2.15 | −2.16 | 1.15 | −1.14 | 1.26 | 1.27 | 0.72 | 1.10 | 0.85 | 0.69 | 1.82 | 0.57 | 1.53 | 0.70 |
| CP4 | 0.00 | 1.80 | −1.84 | 0.44 | −0.43 | 1.13 | 1.38 | 0.94 | 1.21 | 1.10 | 0.90 | 1.31 | 0.56 | 1.04 | 0.76 |
| CP5 | 0.53 | 1.80 | −1.84 | 0.44 | −0.43 | 1.07 | 1.38 | 0.94 | 1.21 | 1.10 | 0.98 | 1.31 | 0.56 | 1.04 | 0.76 |
| CP6 | −0.52 | 1.80 | −1.84 | 0.44 | −0.43 | 1.19 | 1.38 | 0.94 | 1.21 | 1.10 | 0.79 | 1.31 | 0.56 | 1.04 | 0.76 |
| IP3 | 1.69 | 1.80 | −1.84 | 0.44 | −0.43 | 0.96 | 1.38 | 0.94 | 1.21 | 1.10 | 1.22 | 1.31 | 0.56 | 1.04 | 0.76 |
| IP4 | −1.73 | 1.80 | −1.84 | 0.44 | −0.43 | 1.36 | 1.38 | 0.94 | 1.21 | 1.10 | 0.56 | 1.31 | 0.56 | 1.04 | 0.76 |
| CP7 | 0.00 | 2.15 | −2.16 | 1.15 | −1.14 | 1 | 1.27 | 0.72 | 1.10 | 0.85 | 1.00 | 1.82 | 0.57 | 1.53 | 0.70 |
| IP5 | 2.15 | 2.15 | −2.16 | 1.15 | −1.14 | 0.76 | 1.27 | 0.72 | 1.10 | 0.85 | 1.50 | 1.82 | 0.57 | 1.53 | 0.70 |

TABLE 10-continued

| Ex. | Q | Q claim 1 upper boundary | Q claim 1 lower boundary | Q > Eqn 2 | Q < Eqn 3 | y ratio | y Cl. 10 upper bound | y Cl. 10 lower bound | y > Cl. 11 a | y < Cl. 11 b | Calculated w Ratio First vs Last 50% | w ratio upper bound Cl. 13 | w ratio lower bound Cl. 13 | w ratio lower bound Cl. 14 | w ratio lower bound Cl. 14 |
|---|---|---|---|---|---|---|---|---|---|---|---|---|---|---|---|
| IP6 | −2.16 | 2.15 | −2.16 | 1.15 | −1.14 | 1.25 | 1.27 | 0.72 | 1.10 | 0.85 | 0.56 | 1.82 | 0.57 | 1.53 | 0.70 |
| CP8 | 0.00 | 2.38 | −2.37 | 1.62 | −1.61 | 0.85 | 1.20 | 0.57 | 1.03 | 0.69 | 1.16 | 2.16 | 0.57 | 1.85 | 0.66 |
| CP9 | 1.79 | 2.38 | −2.37 | 1.62 | −1.61 | 0.63 | 1.20 | 0.57 | 1.03 | 0.69 | 1.85 | 2.16 | 0.57 | 1.85 | 0.66 |
| CP10 | −1.79 | 2.38 | −2.37 | 1.62 | −1.61 | 0.99 | 1.20 | 0.57 | 1.03 | 0.69 | 0.66 | 2.16 | 0.57 | 1.85 | 0.66 |
| IP7 | 2.34 | 2.38 | −2.37 | 1.62 | −1.61 | 0.57 | 1.20 | 0.57 | 1.03 | 0.69 | 2.16 | 2.16 | 0.57 | 1.85 | 0.66 |
| IP8 | −2.34 | 2.38 | −2.37 | 1.62 | −1.61 | 1.18 | 1.20 | 0.57 | 1.03 | 0.69 | 0.55 | 2.16 | 0.57 | 1.85 | 0.66 |
| CP11 | 0.00 | 2.21 | −2.21 | 1.26 | −1.25 | 0.96 | 1.25 | 0.68 | 1.08 | 0.81 | 1.07 | 1.90 | 0.57 | 1.61 | 0.69 |
| CP12 | 1.12 | 2.21 | −2.21 | 1.26 | −1.25 | 0.85 | 1.25 | 0.68 | 1.08 | 0.81 | 1.33 | 1.90 | 0.57 | 1.61 | 0.69 |
| CP13 | −1.12 | 2.21 | −2.21 | 1.26 | −1.25 | 1.11 | 1.25 | 0.68 | 1.08 | 0.81 | 0.77 | 1.90 | 0.57 | 1.61 | 0.69 |
| IP9 | 1.86 | 2.21 | −2.21 | 1.26 | −1.25 | 0.78 | 1.25 | 0.68 | 1.08 | 0.81 | 1.53 | 1.90 | 0.57 | 1.61 | 0.69 |
| IP10 | −1.87 | 2.21 | −2.21 | 1.26 | −1.25 | 1.22 | 1.25 | 0.68 | 1.08 | 0.81 | 0.61 | 1.90 | 0.57 | 1.61 | 0.69 |

$Q < 0.51\ln(r1) - 1.32$ (Eqn. 2);
$Q > -0.51\ln(r1) + 1.32$ (Eqn. 3) $0.16\ln(r1) + 0.72 < y < 0.079\ln(r1) + 1.27$.
$y > 0.079\ln(r1) + 1.14$;
Cl. 11b: $y < 0.18\ln(r1) + 0.79$.
$-0.0052\ln(r1) + 0.55 < w < -0.37\ln(r1) + 1.82$.
$w > -0.35\ln(r1) + 1.53$;
$w < 0.043\ln(r1) + 0.70$

TABLE 11

Product properties of commercial ethylene vinylacetates copolymers

| Grade | VA content wt % | MI ASTM D1238 g/10 min | Density g/cc | DSC melting point ASTM D3418 °C | Vicat softening point ASTM D1525 °C |
|---|---|---|---|---|---|
| ESCORENE ULTRA FL 00209* | 9.4 | 2.1 | 0.931 | | 78 |
| ESCORENE ULTRA FL 00212* | 12 | 2.5 | 0.934 | | 71 |
| ESCORENE ULTRA FL 00714* | 14 | 7.5 | 0.934 | | 60 |
| ESCORENE ULTRA FL 00623* | 23 | 5.5 | 0.947 | | 51 |
| ESCORENE ULTRA FL 00328* | 27 | 3 | 0.951 | | 44 |
| ESCORENE ULTRA AD 0433EH2 | 33 | 390 | 0.956 | | |
| ELVAX 760 | 9.3 | 2 | 0.93 | 100 | 82 |
| ELVAX 660 | 12 | 2.5 | 0.933 | 96 | 74 |
| ELVAX 560 | 15 | 2.5 | 0.935 | 92 | 71 |
| ELVAX 460 | 18 | 2.5 | 0.941 | 88 | 64 |
| ELVAX 450 | 18 | 8 | 0.941 | 86 | 61 |
| ELVAX 440 | 18 | 30 | 0.927 | 84 | 53 |
| ELVAX 420 | 18 | 150 | 0.937 | 73 | 53 |
| ELVAX 410 | 18 | 500 | 0.934 | 73 | 53 |
| ELVAX 360 | 25 | 2 | 0.948 | 78 | 53 |
| ELVAX 265 | 28 | 3 | 0.951 | 73 | 49 |
| ELVAX 40L-03 | 40 | 3 | 0.967 | 58 | 26 |
| HANWHA LDPE 5316 | 0 | 0.8 | 0.922 | 110 | 92 |
| HANWHA EVA 2020 | 3.5 | 0.5 | 0.924 | 104 | 90 |
| HANWHA EVA 2030 | 6.5 | 0.8 | 0.927 | 101 | 83 |
| HANWHA EVA 2040 | 9.5 | 0.8 | 0.929 | 98 | 77 |
| HANWHA EVA 2050 | 12 | 0.8 | 0.931 | 96 | 72 |

*Peak melting points for ESCORENE ULTRA resins are as follows: FL 00209: 99 C.; ; each as provided in the product data sheet from Supplier (ExxonMobil).

The invention claimed is:

1. A high pressure polymerization process to form an ethylene-based polymer, the process comprising at least the following step:

polymerizing a reaction mixture comprising ethylene and at least one comonomer, using a reactor system comprising a reactor assembly, and the following:

(A) at least two reaction zones, a first reaction zone (reaction zone 1) and an ith reaction zone (reaction zone i where i≥2), (B) at least two ethylene-based feed streams, each feed stream comprising a percentage of a total make-up ethylene fed to the polymerization process, and wherein a first ethylene-based feed stream is sent to reaction zone 1 and a second ethylene-based feed stream is sent to reaction zone i, when i equals 2;

(C) a control system to control the percentage of the total make-up ethylene in the ethylene-based feed stream sent to reaction zone 1, and the percentage of the total make-up ethylene in the ethylene-based feed stream sent to reaction zone i, and wherein a comonomer percentage, Q, is a mole percent of the at least one comonomer fed to the first reaction zone minus a mole percent of the at least one comonomer fed to the ith reaction zone divided by an average mole percent of the at least one comonomer in all ethylene-based feeds to the reactor assembly and meets Equation 2 or Equation 3: Q<0.51 ln(r1)−1.32 (Equation 2), or Q>−0.51 ln(r1)+1.32 (Equation 3); and wherein the at least one comonomer has a reactivity ratio (r1) in a range of 0.3≤r1≤5.0, and a boiling point (1 atm)≤150° C.

2. The process of claim 1, wherein the at least one comonomer is selected from a) a comonomer that comprises at least one heteroatom, b) a polyene, or c) a C8 or higher alpha-olefin.

3. The process of claim 1, wherein the control system comprises a valve control system controlling a flow ratio of one or more ethylene-based feed streams.

4. The process of claim 1, wherein the reactor assembly comprises a tubular reactor, an autoclave reactor, or both a tubular reactor and an autoclave reactor.

5. The ethylene-based polymer formed from the process of claim 1, and wherein the ethylene-based polymer comprises the following properties:

a) for the at least one comonomer, a ratio (y) of a comonomer content of a polymer fraction at a peak temperature in a last reaction zone to a comonomer content of a total polymer produced meets the following relationship: $0.16\ \ln(r1)+0.72<y<0.0791n(r1)+1.27$, where r1 is a reactivity ratio of the comonomer.

6. An ethylene-based polymer formed from the process of claim 1, wherein the ethylene-based polymer comprises the following properties:
  a) for the at least one comonomer, a ratio (y) of a comonomer content of a polymer fraction at a peak temperature in a last reaction zone to a comonomer content of a total polymer produced meets the following relationship: $y>0.0791n(r1)+1.10$, where r1 is a reactivity ratio of the comonomer;
  b) for the at least one comonomer, a ratio (y) of a comonomer content of the polymer fraction at a peak temperature in a last reaction zone to a comonomer content of a total polymer produced meets the following relationship $y<0.18\ \ln(r1)+0.85$, where r1 is a reactivity ratio of the comonomer.

7. The ethylene-based polymer of claim 5, wherein the at least one comonomer is vinyl acetate, and/or wherein the ethylene-based polymer has an overall crystallinity from $-1.03*(V_f)+47.7$ to $-1.03*(V_1)+47.7$, where $V_1$ and $V_f$ represent a vinyl acetate weight percent of the first 50 wt % of the polymer produced and the 50 wt % of the last polymer produced, respectively; and wherein each wt % is based on a total weight of copolymer.

8. A composition comprising the ethylene-based polymer of claim 5, and wherein at least one comonomer comprises one or more hydrolyzable silane groups; and wherein the composition optionally comprises a silanol condensation catalyst and a crosslinking agent.

9. A wire or cable configuration comprising at least one component formed from the composition of claim 8.

* * * * *